United States Patent
Kwak et al.

(10) Patent No.: US 7,408,893 B2
(45) Date of Patent: Aug. 5, 2008

(54) DPCH MULTIPLEXING APPARATUS AND METHOD FOR OUTER LOOP POWER CONTROL IN A W-CDMA COMMUNICATION SYSTEM

(75) Inventors: Yong-Jun Kwak, Yongin-shi (KR); Sung-Ho Choi, Songnam-shi (KR); Beong-Jo Kim, Songnam-shi (KR); Ju-Ho Lee, Kyonggi-do (KR); Sung-Oh Hwang, Yongin-shi (KR)

(73) Assignee: Samsung Electronics Co., Ltd (KR)

( * ) Notice: Subject to any disclaimer, the term of this patent is extended or adjusted under 35 U.S.C. 154(b) by 984 days.

(21) Appl. No.: 10/079,723

(22) Filed: Feb. 19, 2002

(65) Prior Publication Data

US 2003/0076799 A1 Apr. 24, 2003

(30) Foreign Application Priority Data

| Feb. 19, 2001 | (KR) | ................................ 2001-10172 |
| Feb. 20, 2001 | (KR) | ................................ 2001-10951 |
| Feb. 22, 2001 | (KR) | ................................ 2001-9082 |
| May 9, 2001 | (KR) | ................................ 2001-25208 |

(51) Int. Cl.
*H04B 7/185* (2006.01)

(52) U.S. Cl. .................... 370/318; 370/335; 370/342; 370/441

(58) Field of Classification Search ................ 370/230, 370/230.1, 231, 235, 310.1, 315, 328, 329, 370/335, 342, 395.61, 441; 455/13.4, 127.1, 455/522
See application file for complete search history.

(56) References Cited

U.S. PATENT DOCUMENTS

| 5,481,561 | A | * | 1/1996 | Fang ........................ 370/320 |
| 5,570,353 | A | | 10/1996 | Keskitalo et al. ............. 370/18 |
| 6,067,458 | A | * | 5/2000 | Chen ........................ 455/522 |

(Continued)

FOREIGN PATENT DOCUMENTS

DE 19533507 A1 3/1997

(Continued)

OTHER PUBLICATIONS

German Office Action for Application No. 10206896.8 dated Jul. 25, 2003.

(Continued)

*Primary Examiner*—Chau T. Nguyen
*Assistant Examiner*—Donald L Mills
(74) *Attorney, Agent, or Firm*—The Farrell Law Firm, PC

(57) ABSTRACT

Disclosed is a method for transmitting a dedicated physical data channel signal over a dedicated physical data channel in the absence of transmission data to be transmitted over the dedicated physical data channel in order to properly maintain a target SIR (Signal-to-Interference Ratio) when there exists new transmission data after the absence of the transmission data in a CDMA (Code Division Multiple Access) mobile communication system. The method comprises generating a dummy bit generation request signal in the absence of the transmission data; and upon receipt of the dummy bit generation request signal, generating a dummy bit stream, and transmitting a dedicated physical data channel signal created by attaching the CRC bit stream to the dummy bit stream.

6 Claims, 13 Drawing Sheets

U.S. PATENT DOCUMENTS

| | | | |
|---|---|---|---|
| 6,181,683 B1 * | 1/2001 | Chevillat et al. | 370/329 |
| 6,381,229 B1 * | 4/2002 | Narvinger et al. | 370/328 |
| 6,501,748 B1 * | 12/2002 | Belaiche | 370/342 |
| 6,636,496 B1 * | 10/2003 | Cho et al. | 370/335 |
| 6,823,194 B2 * | 11/2004 | Haim | 455/522 |
| 6,836,469 B1 * | 12/2004 | Wu | 370/322 |
| 6,944,468 B2 * | 9/2005 | Okumura | 455/522 |

FOREIGN PATENT DOCUMENTS

| | | |
|---|---|---|
| EP | 0 951 153 | 10/1999 |
| JP | 11-098032 | 4/1999 |
| JP | 2000-114987 | 4/2000 |

OTHER PUBLICATIONS

3rd Generation Partnership Project (3GPP), Technical Specification Group Radio Access Network; Multiplexing and Channel Coding (FDD), TS 25.212, v3.5.0, Release 1999, Dec. 2000.

3rd Generation Partnership Project (3GPP), Technical Specification Group Radio Access Network; Channel Coding and Multiplexing Examples, TR 25.944, v3.3.0, Release 1999, Dec. 2000.

3rd Generation Partnership Project (3GPP), Technical Specification Group Radio Access Network; Physical Channels and Mapping of Transport Channels (TDD), TS 25.221, v3.5.0, Release 1999, Dec. 2000.

Japanese Office Action dated Mar. 16, 2004 issued in a counterpart application, namely, Appln. No. 2002-042294.

* cited by examiner

DPCH MULTIPLEXING APPARATUS AND METHOD FOR OUTER LOOP POWER CONTROL IN A W-CDMA COMMUNICATION SYSTEM

PRIORITY

This application claims priority to an application entitled "DPCH Multiplexing Apparatus and Method for Outer Loop Power Control in a W-CDMA Communication System" filed in the Korean Industrial Property Office on Feb. 19, 2001 and assigned Serial No. 2001-10172, an application entitled "DPCH Multiplexing Apparatus and Method for Outer Loop Power Control in a W-CDMA Communication System" filed in the Korean Industrial Property Office on Feb. 20, 2001 and assigned Serial No. 2001-10951, an application entitled "DPCH Multiplexing Apparatus and Method for Outer Loop Power Control in a W-CDMA Communication System" filed in the Korean Industrial Property Office on Feb. 22, 2001 and assigned Serial No. 2001-9082, an application entitled "DPCH Multiplexing Apparatus and Method for Outer Loop Power Control in a W-CDMA Communication System" filed in the Korean Industrial Property Office on May 9, 2001 and assigned Serial No. 2001-25208, the contents of all of which are hereby incorporated by reference.

BACKGROUND OF THE INVENTION

1. Field of the Invention

The present invention relates generally to a CDMA (Code Division Multiple Access) mobile communication system, and in particular, to a DPCH (Dedicated Physical Channel) multiplexing apparatus and method for performing outer loop power control by properly maintaining a target SIR (Signal-to-Interference Ratio).

2. Description of the Related Art

In general, a channel structure of a UMTS (Universal Mobile Terrestrial System) CDMA mobile communication system is classified into a physical channel, a transport channel and a logical channel. The physical channel is divided into a downlink physical channel and an uplink physical channel according to its data transmission direction. Further, the downlink physical channel is divided into a physical downlink shared channel (PDSCH) and a downlink dedicated physical channel (DPCH), which will be described with reference to FIG. 1.

FIG. 1 illustrates a structure of a downlink dedicated physical channel in a mobile communication system. Referring to FIG. 1, each frame of the downlink dedicated physical channel is comprised of 15 slots Slot#0-Slot#14. Each slot is comprised of dedicated physical data channels (DPDCHs) for transmitting upper layer data from a Node B to a UE (User Equipment), and dedicated physical control channels (DPCCHs) for transmitting a physical layer control signal. The dedicated physical control channel DPCCH is comprised of a TPC (Transport Power Control) symbol for controlling transmission power of the UE, a TFCI (Transport Format Combination Indicator) symbol, and a pilot symbol. As illustrated in FIG. 1, each of the slots Slot#1-Slot#14 constituting one frame of the downlink dedicated physical channel is comprised of 2560 chips. in FIG. 1, a first data symbol Data1 and a second data symbol Data2 represent upper layer data transmitted from the Node B to the UE over the dedicated physical data channel DPDCH, and the TPC symbol represents information for controlling transmission power of the UE by the Node B. Further, the TFCI symbol indicates a transport format combination (TFC) used for a downlink channel transmitted for a current one frame (=10 ms). Finally, the pilot symbol represents a criterion for controlling transmission power of the dedicated physical channel by the UE. Here, information included in the TFCI can be classified into a dynamic part and a semi-static part. The dynamic part includes TBS (Transport Block Size) information and TBSS (Transport Block Set Size) information. The semi-static part includes TTI (Transmission Time Interval) information, channel coding scheme information, coding rate information, static rate matching information, and CRC (Cyclic Redundancy Check) size information. Therefore, the TFCI indicates the number of transport blocks (TB) in a channel transmitted for one frame, and assigns unique numbers to TPCs used in each of the transport blocks.

FIG. 2 illustrates a structure of an uplink dedicated physical channel in a mobile communication system. Referring to FIG. 2, like the downlink dedicated physical channel, the uplink dedicated physical channel is comprised of 15 slots Slot#1-Slot#14. The uplink dedicated physical channel has an uplink dedicated physical data channel (DPDCH) and an uplink dedicated physical control channel (DPCCH). Each of the slots Slot#0-Slot#14 constituting one frame of the uplink dedicated physical data channel DPDCH transmits upper layer data from the UE to the Node B.

Meanwhile, each of the slots Slot#0-Slot#14, which constitutes one frame of the uplink dedicated physical control channel is comprised of (i) a pilot symbol used as a channel estimation signal when demodulating data transmitted from the UE to the Node B, (ii) a TFCI symbol indicating a transport format combination (TFC) of channels transmitted for a current frame, (iii) an FBI (FeedBack Information) symbol for transmitting feedback information when transmission diversity is used, and (iv) a TPC symbol for controlling transmission power of the downlink channels.

Transmission power of the downlink/uplink dedicated physical channels shown in FIGS. 1 and 2 is controlled by a high-speed power control method such as a closed-loop power control method or an outer loop power control method. Herein, the outer loop power control will be described.

The outer loop power control method compares a target SIR required in the high-speed power control method with an actual SIR of the channel, for both the downlink channel and the uplink channel, and controls the transmission power by resetting a threshold for the closed-loop power control based on the comparison result between the target SIR and the actual SIR. In general, it is important for the power control method to maintain a bit error rate (BER) or a block error rate (BLER) in order to satisfy required communication performance. The outer loop power control method maintains the BER or the BLER at a required level by continuously resetting a threshold for maintaining the BER or the BLER. The UE and the Node B may measure the BER or the BLER through CRC error detection by analyzing CRC bits included in the received dedicated physical data channel.

FIG. 5 illustrates a structure of a physical downlink shared channel (PDSCH) in a mobile communication system. Referring to FIG. 5, a 10 ms-frame of the physical downlink shared channel is comprised of 15 slots Slot#0-Slot#14. Since the UMTS system has a chip rate of 3.84 Mcps, each of the slots is comprised of 2560 chips.

The physical downlink shared channel transmits upper layer data from the Node B to the UE in association with the dedicated physical channel, for power control and transport format combination indication. The physical downlink shared channel is shared by a plurality of UEs on a time division basis to efficiently transmit a large amount of packet data to the UEs. In order for the UE to use the physical downlink shared channel, separate dedicated physical channels between the UE and the Node B, (namely, the downlink dedicated physical channel and the uplink dedicated physical channel associated (or interlocked) with the physical downlink shared channel) should be maintained. Therefore, in order for the UE to use the physical downlink shared channel, it should separately establish the downlink and uplink dedicated physical channels. For example, if N UEs use the physical downlink shared channel, N downlink and N uplink dedicated physical channels (i.e., one such dedicated channel to each UE) are established so that the N UEs share the physical downlink shared channel on a time division basis. Meanwhile, the physical downlink shared channel is a physically established channel so as to transmit a large amount of packet data, while the dedicated physical channel is physically established to transmit a relatively small amount of control data and retransmission-related data, compared with the physical downlink shared channel. A detailed description of this will be made herein below.

A TFCI bit $TFCI_{DPCH}$ transmitted over the dedicated downlink physical channel has information indicating a transport format of the physical downlink shared channel. Therefore, the downlink TFCI indicates a UE to which packet data was transmitted over the physical downlink shared channel after a lapse of a predetermined time from a given time point. The UE can recognize whether there is physical downlink shared channel data to receive, by continuously analyzing the downlink dedicated physical channel received. Therefore, when the TFCI received by the UE indicates that there exists data to receive in the physical downlink shared channel of the next frame, the UE receives the data transmitted by the Node B by demodulating and decoding a signal received over the physical downlink shared channel at the next frame. During the data transmission over the dedicated physical channel, transmission power is controlled using the outer loop power control, a description of which will be separately made for normal transmission and gated transmission.

When the uplink or downlink channel has no transport channel data during normal transmission, i.e., normal data transmission, CRC bits are transmitted over the dedicated physical channel for the outer loop power control. However, if only the CRC bits are transmitted or repeated for the outer loop power control while there is no transport channel data, a combining gain will occur at the receiver, causing a decrease in a target SIR. Therefore, when there is transport channel data generated later, the BLER becomes high until the target SIR is recovered, because of the decrease in the target SIR due to transmission of only the CRC bits during non-existence of the transport channel data.

In addition, even when the outer loop power control is applied to the gated transmission, in order to perform outer loop power control while gating a dedicated physical control channel during data communication where a dedicated channel (DCH) is interlocked with a downlink shared channel (DSCH), it is necessary to measure the BER or BLER through CRC error detection. A detailed description of this will be made herein below.

Herein, a state where the downlink shared channel and the dedicated channel are established will be defined as a "DSCH/DCH state". In the DSCH/DCH state, a UE in data communication should transmit/receive a downlink dedicated channel signal and an uplink dedicated channel signal interlocked with the downlink shared channel, in order to maintain a proper channel state through power control for a waiting time. Continuously transmitting/receiving the downlink and uplink dedicated channel signals in order to maintain the channels wastes battery power of the UE and increases interference to the downlink and the uplink, thus limiting the number of UEs that can share the downlink shared channel.

To solve this problem, the UMTS channel scheme performs DPCCH gating for efficient radio channel management by optionally reducing the number of slot signals (15 slots/frame) transmitted for every 10 ms-frame over the dedicated physical control channel in a state where the dedicated physical data channel has no information data (including CRC bits and tail bits). That is, since that the dedicated physical control channel is subject to gating means that there is no user data transmitted over the dedicated physical data channel, a length of the user data becomes zero (0). A start and end of the DPCCH (Dedicated Physical Control Channel) gating operation can be performed through either a control message from an upper layer, i.e., a Layer 3, or a TFCI bit. As a result, it is possible to secure efficient utilization of radio resources and reduce battery consumption by the UE, by reducing an amount of radio channel resources required in maintaining the dedicated physical channel for the period where no user data is transmitted over the physical channel due to the DPCCH gating operation.

In the DPCCH gating mode, there is no user data (including CRC bits and tail bits), so data transmission over the dedicated physical data channel is suspended. Therefore, a process for multiplexing the downlink or uplink dedicated physical data channel is not required. However, in order to perform outer loop power control even while performing the DPCCH gating, it is necessary to measure the BER or BLER through CRC error detection. Therefore, even though there is no user data to transmit during the DPCCH gating, the dedicated physical data channel including the CRC should be transmitted.

As described above, in the gated transmission mode, only the CRC is repeatedly transmitted over the dedicated physical data channel, so combining occurs at the receiver, causing a decrease in the target SIR. As a result, when transmitting transport channel data after the end of the DPCCH gating, the BLER becomes high until the target SIR is recovered, because of the decrease in the target SIR due to the DPCCH gating, thus making it difficult to secure reliable outer loop power control.

Specifically, a DPCH (Dedicated Physical Channel) multiplexing method performs rate matching using Equation (1) defined in the 3GPP ($3^{rd}$ Generation Partnership Project) standard (see 3GPP TS25.212 V3.4.0: Multiplexing and Channel Coding).

$$Z_{0,j} = 0$$

$$Z_{i,j} = \left\lfloor \frac{\left(\left(\sum_{m=1}^{i} RM_m \times N_{m,j}\right) \times N_{data,j}\right)}{\sum_{m=1}^{i} RM_m \times N_{m,j}} \right\rfloor$$

for all $i = 1, \ldots, I$ $$\Delta N_{i,j} = Z_{i,m} - Z_{i-1,j} - N_{i,j}$$

for all $i = 1, \ldots, I$

Equation (1)

In Equation (1), $N_{I,j}$ for the uplink represents the number of bits included in one radio frame of an $i^{th}$ transport channel of a transport format combination (TFC) j before rate matching and for the downlink represents a multiple of ⅛, an intermediate parameter used in the rate matching process. Further, $N_{data,j}$ represents the total number of bits filled in CCTrCH (Coded Composite Transport Channel) included in one radio frame of the transport format combination j, $RM_i$ represents a rate matching constant of an $i_{th}$ transport channel, and $Z_{i,j}$ represents an intermediate rate matching parameter. In addition, for the uplink, $\Delta N_{i,j}$ represents a final target value in rate matching. If the $\Delta N_{i,j}$ is a positive number, it represents the number of bits repeated within one radio frame of the $i^{th}$ transport channel of the transport format combination j, and if the $\Delta N_{i,j}$ is a negative number, it represents the number of punctured bits. However, for the downlink, the $\Delta N_{i,j}$ is used as an intermediate parameter, a value of which is a multiple of ⅛, and 1 represents the number of transport channels included in the CCTrCH.

In the uplink channel, since transmission data is subject to rate matching after being segmented in a radio frame unit, the number $\Delta N_{i,j}$ of repeated or punctured bits of the radio frames is calculated in accordance with Equation (1) based on $N_{i,j}$ and $N_{data,j}$, and the rate matching is performed in the process disclosed in 3GPP TS25.212.

However, in the downlink channel, since the transmission data is subject to rate matching in a TTI unit before being segmented in a radio frame unit, the rate matching is performed based on $N_{i,l}^{TTI}$ unlike in the uplink channel, and this method is disclosed in 3GPP TS25.212. The $N_{i,l}^{TTI}$ is a parameter used only in the downlink, and represents the number of bits included in one TTI for the case of a transport format l in the $i^{th}$ transport channel before rate matching. In the case of the downlink channel, the positions of the transport channels in the radio frame can be either fixed regardless of the transport format combination or varied according to the transport format combination. The intermediate parameters $N_{i,j}$ and $\Delta N_{i,j}$ used in Equation (1) have a different calculation method and also have a different rate matching process according to circumstances. In the case of the downlink channel, since $N_{data,j}$ does not depend on j, it is replaced with $N_{data,*}$ in Equation (1).

In the downlink channel, if the transport channels have the fixed positions, $N_{1,j}$ does not depend upon j. Therefore, it is replaced with $N_{i,*}$. After $N_{i,*}$ is calculated in accordance with Equation (2) below, $\Delta N_{i,*}$ is calculated in accordance with Equation (1) using the values of $N_{i,*}$ and the $N_{data,*}$. From the calculated $\Delta N_{i,*}$, a rate matching target value $\Delta N_{i,l}^{TTI}$ is calculated in a TTI unit of a transport channel i with a transport format l by the process defined in 3GPP TS25.212. If the $\Delta N^{i,j,TTI}$ is a positive number, it represents the number of bits repeated in each TTI of the transport channel i with the transport format l. However, if the $\Delta N_{i,l}^{TTI}$ is a negative number, it represents the number of punctured bits.

$$N_{i,*} = \frac{1}{F_i} \times (\max_{l \in TFS(i)} N_{i,l}^{TTI}) \quad \text{Equation (2)}$$

In Equation (2), $F_l$ indicates the number of radio frames included in one TTI of the transport channel i, and TFS(i) indicates a set of a transport format index l for the transport channel i.

In the downlink channel, if the transport channels have variable positions according to the transport format combination, $N_{i,j}$ is calculated in accordance with Equation (3), and then, $\Delta N_{i,j}$ is calculated in accordance with Equation (1) using the $N_{i,j}$ and the $N_{data,*}$. The rate matching target value $\Delta N_{i,l}^{TTI}$ is calculated in a TTI unit of the transport channel i with the transport format l based on the calculated $\Delta N_{i,j}$ and the process defined in 3GPP TS25.212.

$$N_{i,j} = \frac{1}{F_i} \times N_{i,TF_i(j)}^{TTI} \quad \text{Equation (3)}$$

In Equation (3), $TF_i(j)$ represents a transport format of the transport channel i for the transport format combination j.

Therefore, if channel coding is performing by transmitting only the CRC and/or the tail bit required in measuring the BER or BLER for outer loop power control in a state where there is no user data, the rate matching is performed in accordance with Equations (1) to (3) and the process defined in 3GPP TS25.212, thus the number of bits repeated in rate matching after channel coding is larger than when the transport channel data and the CRC are transmitted together. Therefore, when the user data is normally transmitted over the dedicated physical data channel after the end of the DPCCH gating, the target SIR is set to a relatively low value due to the outer loop power control performed by transmitting only the CRC, so that it is not possible to efficiently perform the high-speed power control at an initial power control stage. This problem commonly occurs when performing the outer loop power control by transmitting only the CRC, regardless of whether the gating is applied.

SUMMARY OF THE INVENTION

It is, therefore, an object of the present invention to provide an apparatus and method for multiplexing a dedicated physical channel so as to perform reliable outer loop power control in a CDMA communication system.

It is another object of the present invention to provided an apparatus and method for multiplexing a dedicated physical channel so as to perform accurate outer loop power control by transmitting a dedicated physical data channel according to a gating rate during gated-transmission of a dedicated physical control channel in a CDMA communication system.

It is further another object of the present invention to provide a DPCH (Dedicated Physical Channel) multiplexing apparatus and method for performing outer loop power control (OLPC) by accurately measuring an SIR in a gated transmission mode in a CDMA communication system.

It is yet another object of the present invention to provide a DPCH multiplexing apparatus and method for performing outer loop power control by transmitting a dummy bit along with CRC bits over a dedicated physical channel in a CDMA communication system.

It is still another object of the present invention to provide a DPCH multiplexing apparatus and method for performing outer loop power control by transmitting a proper number of dummy bits, determined based on a gating rate, along with CRC bits in a gated transmission mode in a CDMA communication system.

To achieve the above and other objects, there is provided an apparatus for transmitting a dedicated physical data channel signal over a dedicated physical data channel in the absence of transmission data to be transmitted over the dedicated physical data channel in order to properly maintain a target SIR when there exists new transmission data after the absence of the transmission data in a CDMA mobile communication system. The apparatus includes a controller for generating a dummy bit generation request signal in the absence of the transmission data; a dummy bit generator for generating a dummy bit stream upon receipt of the dummy bit generation request signal; a CRC (Cyclic Redundancy Check) attachment part for attaching a CRC bit stream to the dummy bit stream; and a channel multiplexing part for mapping a first bit stream created by attaching the CRC bit stream to the dummy bit stream, to the dedicated physical data channel.

To achieve the above and other objects, the present invention also comprises a method for transmitting a dedicated physical data channel signal over a dedicated physical data channel in the absence of transmission data to be transmitted over the dedicated physical data channel in order to properly maintain a target SIR (Signal-to-Interference Ratio) when there exists new transmission data after the absence of the transmission data in a CDMA (Code Division Multiple Access) mobile communication system. The method comprises generating a dummy bit generation request signal in the absence of the transmission data; and upon receipt of the dummy bit generation request signal, generating a dummy bit stream, and transmitting a dedicated physical data channel signal created by attaching the CRC bit stream to the dummy bit stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
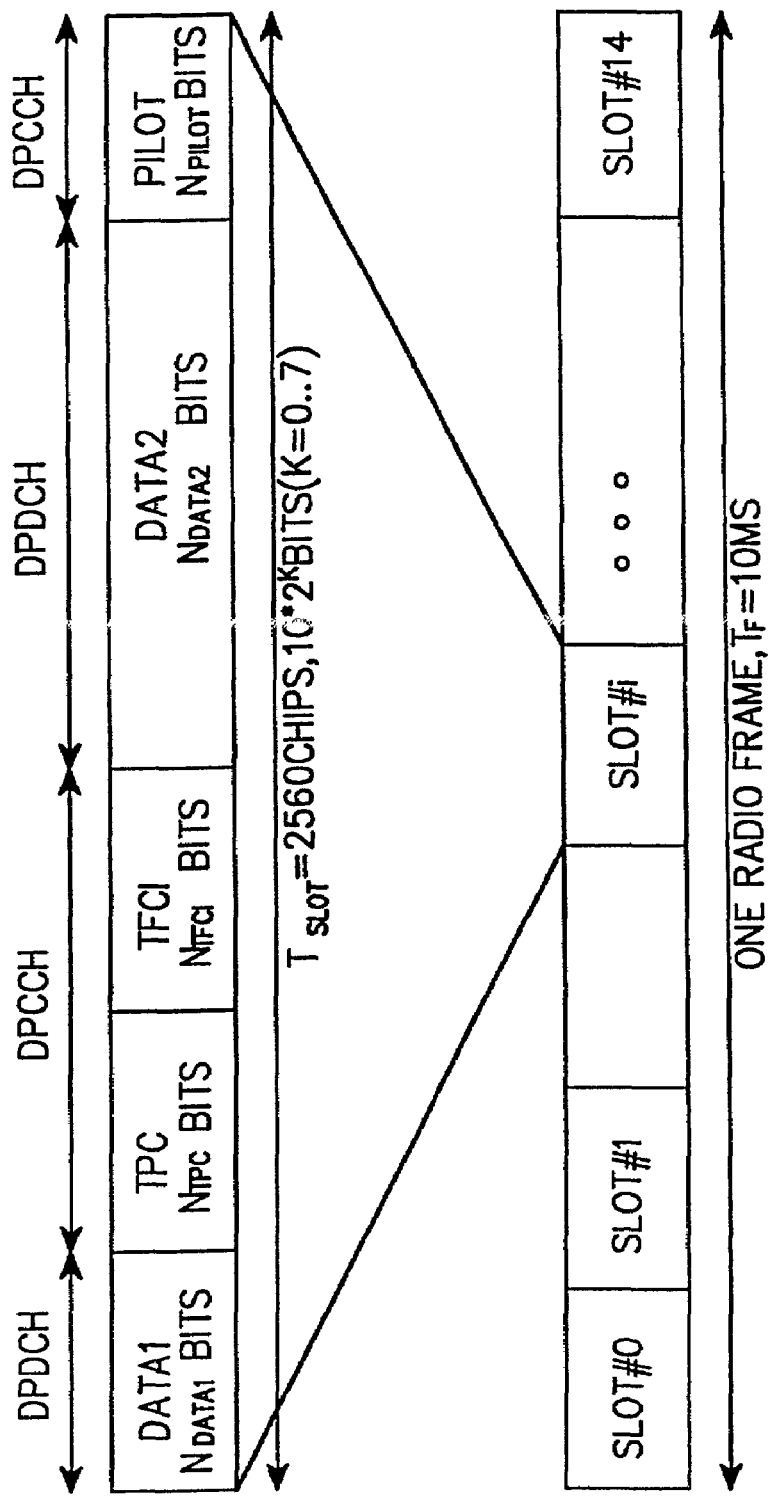
FIG. 1 illustrates a structure of a downlink dedicated physical channel in a general mobile communication system.
Figure 2:
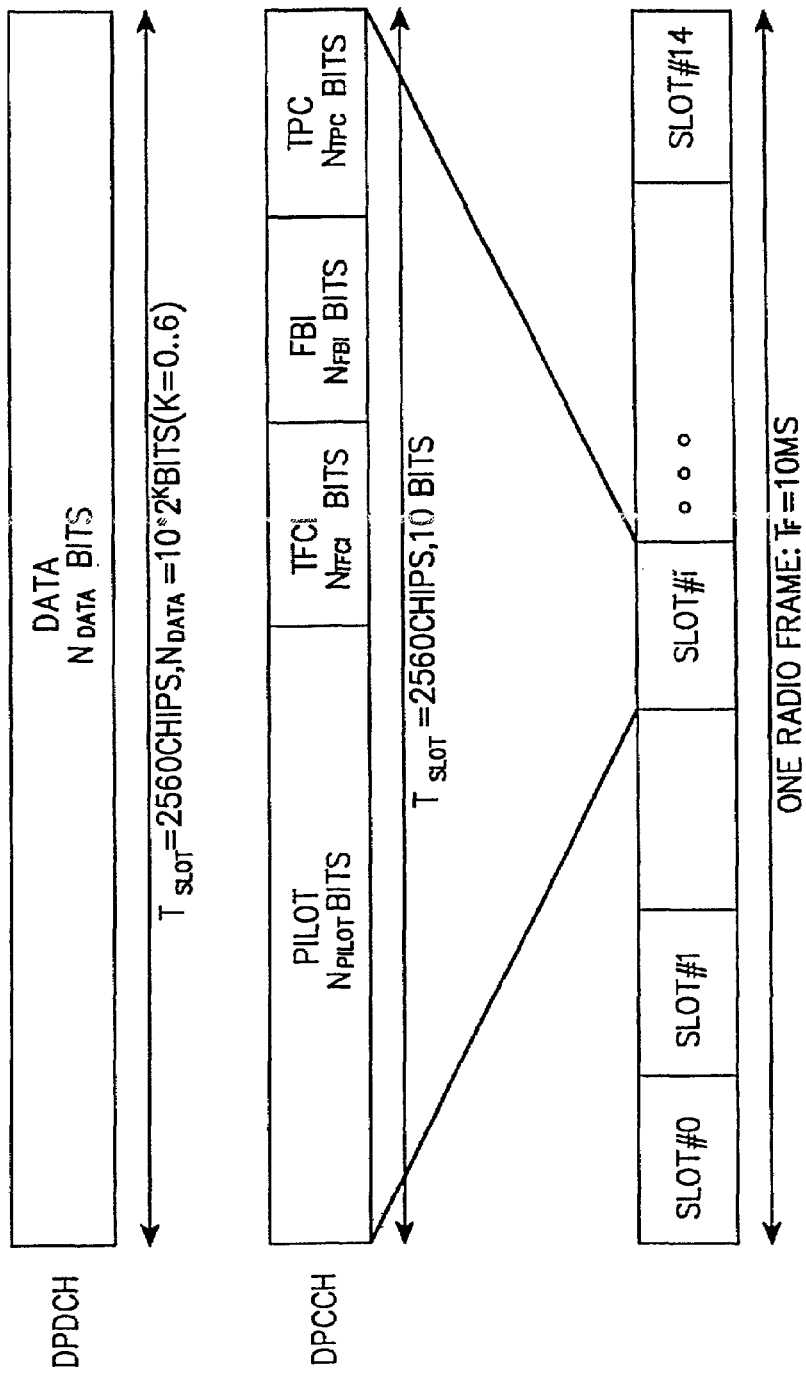
FIG. 2 illustrates a structure of an uplink dedicated physical channel in a general mobile communication system.
Figure 3:
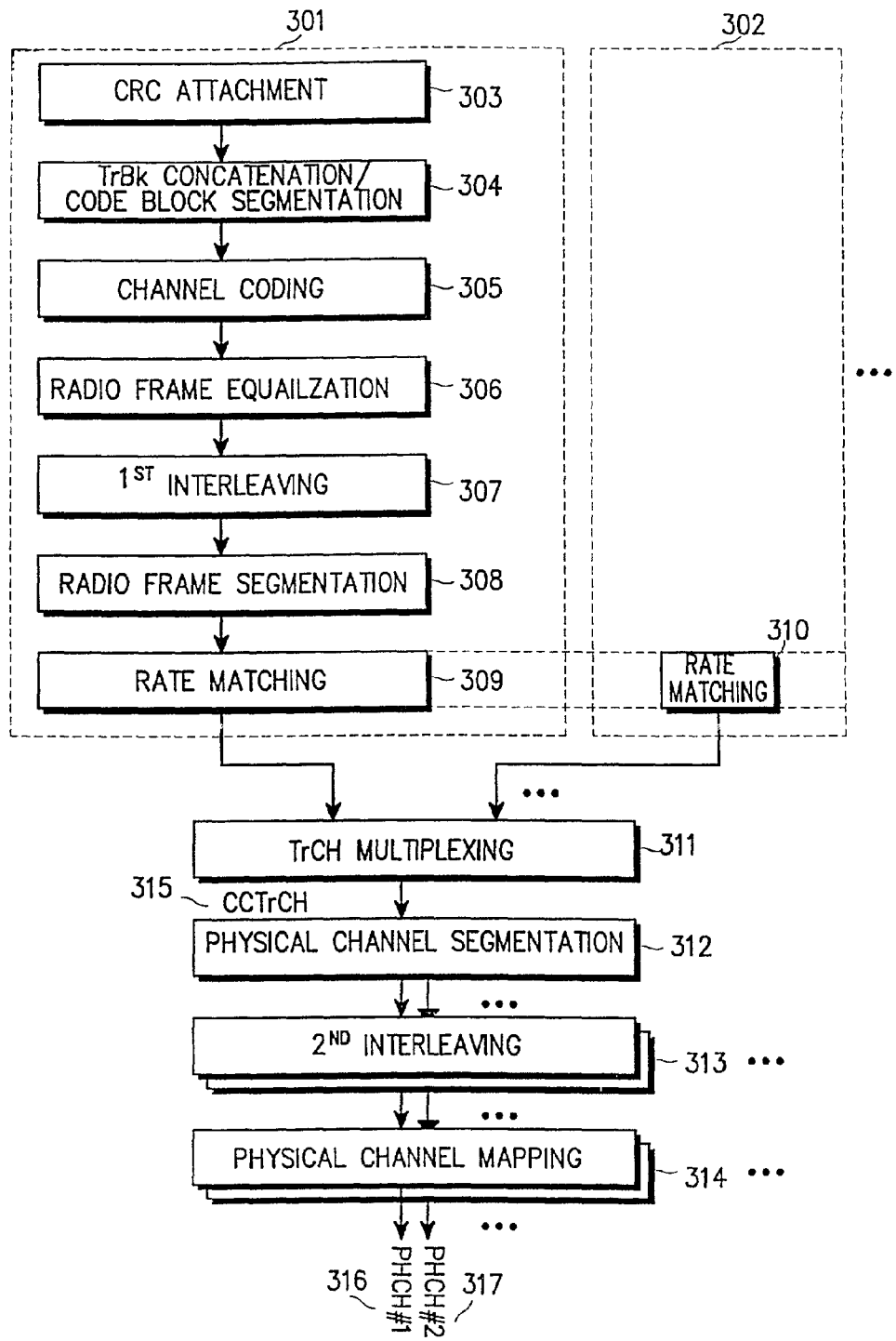
FIG. 3 illustrates a method for multiplexing an uplink dedicated physical channel for outer loop power control in a W-CDMA communication system according to an embodiment of the present invention.

FIG. 3 illustrates a scheme for multiplexing an uplink transport channel in a CDMA communication system. Referring to FIG. 3, reference numeral 301 represents an uplink transport channel generation block. For the sake of convenience, the uplink transport channel generation block 301 will be referred to as an "uplink transport channel chain". Further reference numeral 302 represents another uplink transport channel generation block. Transmission data input to the uplink transport channel chain 301 is first provided to a CRC attachment part 303. The CRC attachment part 303 adds CRC bits for BLER checking to the transmission data and provides the CRC bit-added transmission data to a TrBk (Transport Block) concatenation/code block segmentation part 304. The TrBk concatenation/code block segmentation part 304 concatenates or segments the CRC bit-added transmission data in a code block size proper for channel coding, and provides its output to a channel coding part 305. The channel coding part 305 channel-codes the signal output from the TrBk concatenation/code block segmentation part 304 as that the signal has a channel error-independent property, and provides its output to a radio frame equalization part 306 in the form of a bit stream. The radio frame equalization part 306 equalizes the bit stream output from the channel coding part 305 in a 10 ms-radio frame unit, and provides its output to a first interleaving (or primary interleaving) part 307. The first interleaving part 307 interleaves the signal output from the radio frame equalization part 306 according to a predetermined interleaving rule, and provides its output to a radio frame segmentation part 308. Here, the interleaving can be performed in a unit of 10 ms, 20 ms, 40 ms and 80 ms, and the interleaving unit becomes TTI (Transmission Time Interval). When the TTI has a value other than 10 ms, the output of the first interleaving part 307 is segmented again to be proper for 10 ms by the radio frame segmentation part 308, and then provided to a rate matching part 309. The rate matching part 309 generates a bit stream proper for one radio frame size by puncturing or repeating the signal output from the radio frame segmentation part 308, and outputs one transport channel (TrCH). Therefore, two uplink transport channels are created with the outputs of rate matching parts 309 and 310. Of course, an increase in the number of the uplink transport channel chains increases the number of the transport channels created. The created transport channels TrCHs are provided to a TrCH multiplexing part 311. The TrCH multiplexing part 311 multiplexes a plurality of the transport channels into one coded composite transport channel CCTrCH, and provides its output to a physical channel segmentation part 312. The physical channel segmentation part 312 segments the CCTrCH output from the TrCH multiplexing part 311 in 10 ms size so that it can be mapped to a physical channel, and then provides its output to a second interleaving (or secondary interleaving) part 313. The second interleaving part 313 interleaves the signal output from the physical channel segmentation part 312 according to a predetermined interleaving rule, and provides its output to a physical channel mapping part 314. Here, an interleaving unit of the second interleaving part 313 becomes 10 ms, which is equal to a size of one radio frame. Finally, the data segmented and interleaved by the physical channel segmentation part 312 and the second interleaving part 313 is mapped into first and second physical channels PhCH#1 (316) and PhCH#2 (317) by a physical channel mapping part 314.

Figure 4:
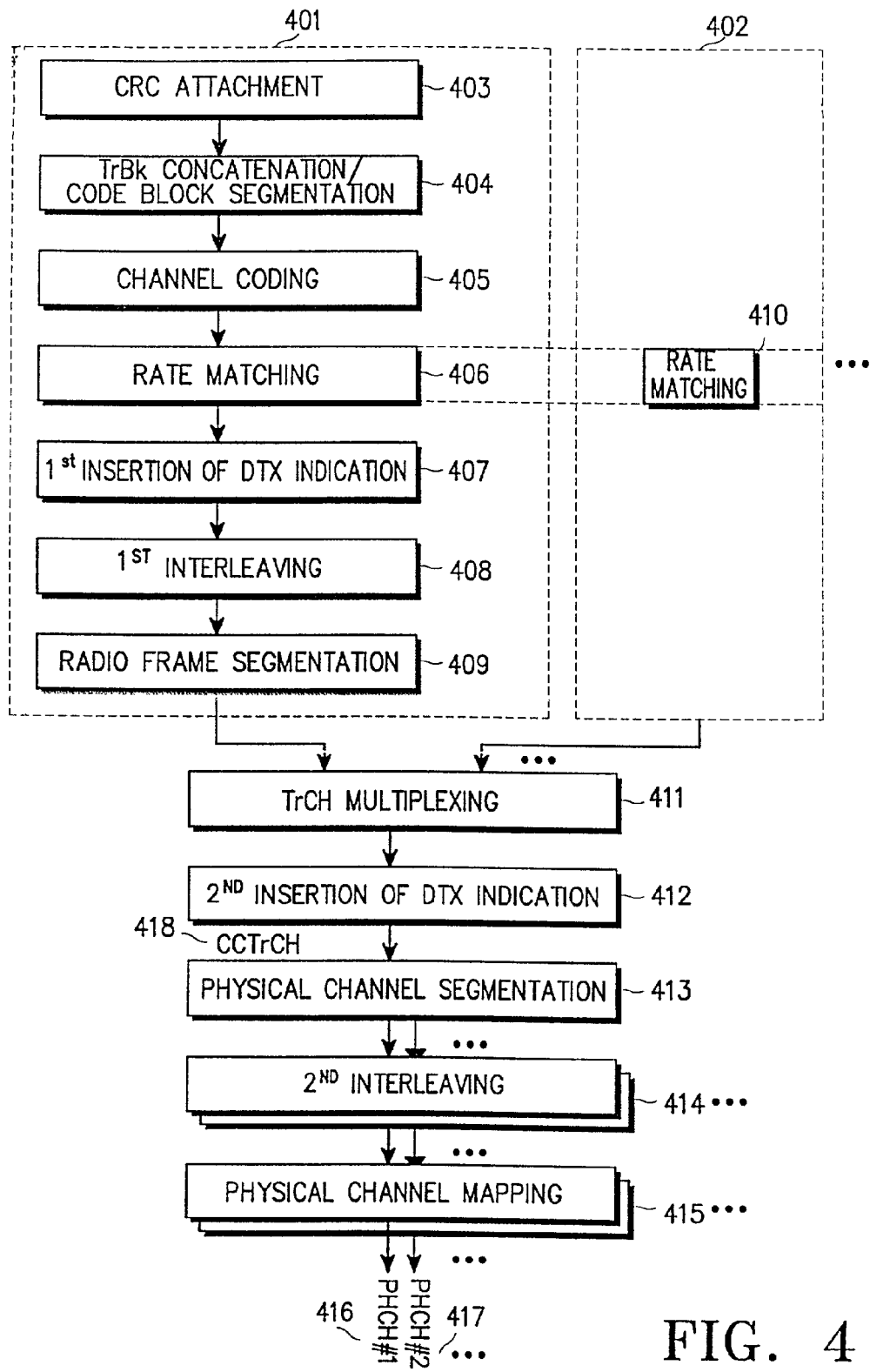
FIG. 4 illustrates a method for multiplexing a downlink dedicated physical channel for outer loop power control in a W-CDMA communication system according to an embodiment of the present invention.
Figure 5:
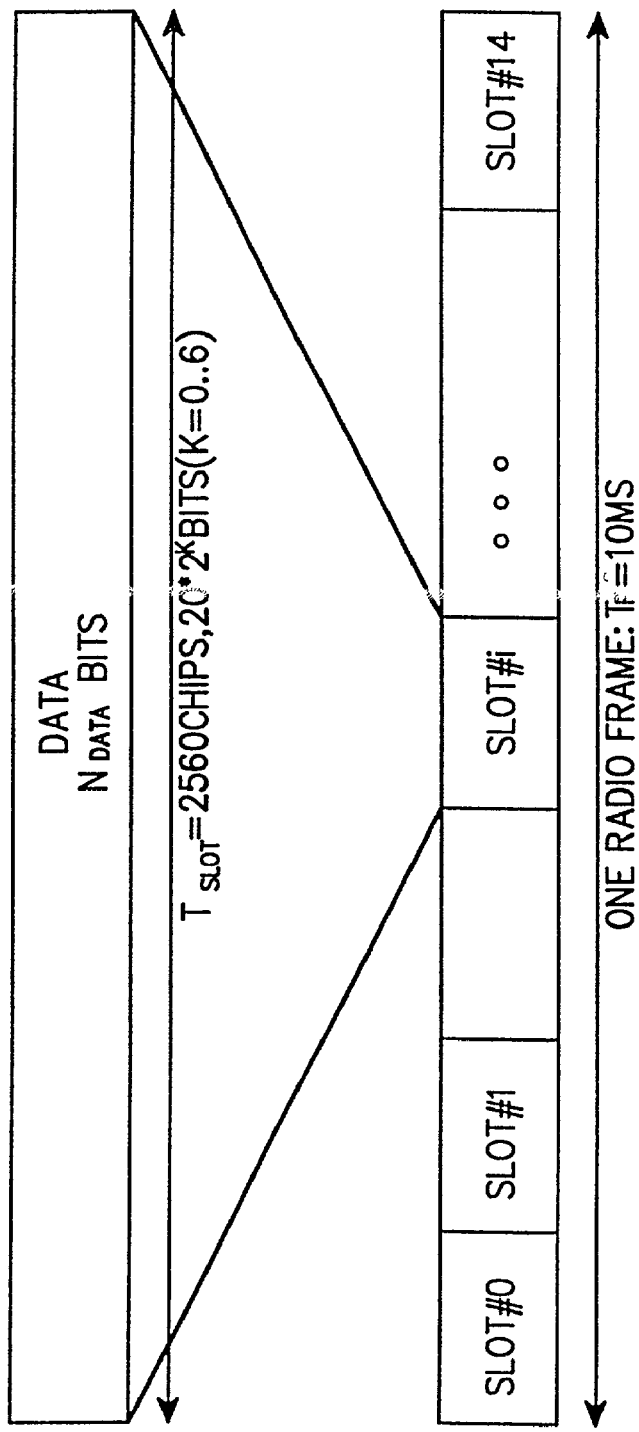
FIG. 5 illustrates a structure of a physical downlink shared channel in a mobile communication system.

FIG. 4 illustrates a scheme for multiplexing a downlink transport channel in a CDMA communication system. The downlink channel multiplexing process is very similar to the uplink channel multiplexing process, except that a rate matching part 406 is arranged at the next stage of a channel coding part 405 as shown in FIG. 4. The downlink transport channel multiplexing scheme further includes a first insertion of DTX (Discontinuous Transmission) part 407 or/and a second insertion of DTX part 412. In addition, reference numeral 401 represents a downlink transport channel generation block. Herein, for the sake of convenience, the downlink transport channel generation block 401 will be referred to as a "downlink transport channel chain". Reference numeral 402 represents another downlink transport channel chain. A detailed description of the downlink transport channel chains will be given herein below.

Downlink transmission data input to the downlink transport channel chain 401 is first provided to a CRC attachment part 403. The CRC attachment part 403 adds CRC bits for BLER checking to the transmission data and provides the CRC bit-added transmission data to a TrBk concatenation/code block segmentation part 404. The TrBk concatenation/code block segmentation part 404 concatenates or segments the signal output from the CRC attachment part 403 in a code block size proper for channel coding, and provides its output to a channel coding part 405. The channel coding part 405 channel-codes the signal output from the TrBk concatenation/code block segmentation part 404 as that the signal has a channel error-independent property, and then provides its output to rate matching part 406. The rate matching part 406 rate-matches the signals output from the channel coding part 405 and provides its output to the first insertion of DTX indication part 407. The first insertion of DTX indication part 407 inserts a DTX indicator indicating a data transmission-off point into the signal output from the rate matching part 406, and provides its output to a first interleaving part 408. The first interleaving part 408 interleaves the signal output from the first insertion of DTX indication part 407 according to a predetermined interleaving rule, and provides its output to a radio frame segmentation part 409. Here, the interleaving can be performed in a unit of 10 ms, 20 ms, 40 ms and 80 ms, and the interleaving unit becomes TTI. When the TTI has a value other than 10 ms, the output of the first interleaving part 408 is segmented again to be proper for 10 ms by the radio frame segmentation part 409. Finally, the radio frame segmentation part 409 generates one transport channel. Likewise, the downlink transport channel chain 402 also generates another transport channel. Of course, an increase in the number of the downlink transport channel chains increases the number of the transport channels generated. The generated transport channels TrCHs are provided to a TrCH multiplexing part 411. The TrCH multiplexing part 411 multiplexes a plurality of the transport channels, and provides its output to a second insertion of DTX indication part 412. The second insertion of DTX indication part 412 inserts a second DTX indicator into the signal output from the TrCH multiplexing part 411, and provides the DTX indicator-inserted signal to a physical channel segmentation part 413. Here, one CCTrCH 418 is generated by inserting the second DTX indicator as shown in FIG. 4. The physical channel segmentation part 413 then segments the generated CCTrCH that it can be mapped to a plurality of 10 ms-physical channels, and then provides its output to a second interleaving part 414. The second interleaving part 414 interleaves the signal output from the physical channel segmentation part 413 according to a predetermined interleaving rule, and provides its output to a physical channel mapping part 415. Here, an interleaving unit of the second interleaving part 415 becomes 10 ms, which is equal to a size of one radio frame. Finally, the data segmented and interleaved by the physical channel segmentation part 413 and the second interleaving part 414 is mapped into first and second physical channels PhCH#1 (416) and PhCH#2 (417) by a physical channel mapping part 415, completing the downlink transport channel multiplexing process.

The uplink and downlink transport channel multiplexing processes of FIGS. 3 and 4 are performed by a transmitter. An uplink/downlink receiver has a symmetrical structure of the transmitter, so a description of the receiver will not be provided. For example, the receiver has a channel decoding part, a deinterleaving part, a demultiplexing part and a removal of DTX indication part, in place of the channel coding part, the interleaving part, the multiplexing part and the insertion of DTX indication part, respectively.

The present invention defines Equation (4) so as to use Equation (1) for the uplink TrCH multiplexing part 311 during the DPCCH gating, in order to resolve the problem that the target SIR is set to a lower value compared with the normal transmission, when the outer loop power control repeatedly transmits only the CRC bits or the tail bits during the DPCCH gating.

$$\frac{\Delta N_{i,j}}{N_{i,j}} = K \text{ (constant)} \qquad \text{Equation (4)}$$

That is, Equation (4) should be satisfied in order to efficiently perform the outer loop power control by maintaining the target SIR regardless of the DPCCH gating operation.

In order to provide a rate matching method efficient at the gating while satisfying Equation (4), the parameters $N_{i,j}$ and $N_{data,j}$ in Equation (1) are newly defined to provide Equation (5), a rate matching formula available for the uplink DPCCH gating.

$$Z_{0,j} = 0 \qquad \text{Equation (5)}$$

$$A_{i,j}^{gating} = \left\lfloor \frac{\left(\left(\sum_{m=1}^{i} RM_m \times N_{m,j}^{gating}\right) \times N_{data,j}^{gating}\right)}{\sum_{m=1}^{i} RM_m \times N_{m,j}^{gating}} \right\rfloor$$

for all $i = 1, \ldots, l$ $$\Delta N_{i,j}^{gating} = Z_{i,j}^{gating} - Z_{i-1,j}^{gating} - N_{i,j}^{gating}$$

for all $i = 1, \ldots, l$

In Equation (5), $N_{i,j}^{gating}$ depicts the number of bits included in one radio frame in an $i^{th}$ transport channel of a transport format combination j before rate matching during the gating. The $N_{i,j}^{gating}$ represents the number of bits included in one radio frame set up to equally or similarly maintain a transmission power level of the symbols or bits transmitted before the gating, as well as a transmission power level of the CRC bits or the other bits transmitted for the outer loop power control during the gating. The reason for equally or similarly maintaining a transmission power level of the symbols or bits transmitted before the gating and a transmission power level of the CRC bits or the remaining bits transmitted for the outer loop power control during the gating is because when the CRC bits or the remaining bits are transmitted without setting up of the $N_{i,j}^{gating}$ during the gating, they may be excessively repeated in actual transmission. The excessive repetition causes a combining effect at the receiver, resulting in a decrease in the target SIR in actual transmission during the gating. Therefore, during normal data transmission over the DPCCH after the end of the gating, the outer loop power control may have a power control error for an initial period due to the decrease in the target SIR. In setting the $N_{i,j}^{gating}$, if a gating rate is 1/n, then $N_{i,j}^{gating} = \lfloor N_{i,j}/n \rfloor$ or $N_{i,j}^{gating} = \lfloor \lfloor N_{i,j} \times (1/n) \rfloor \times R \rfloor \times R^{-1}$.

The second formula, $N_{i,j}^{gating} = \lfloor \lfloor N_{i,j} \times (1/n) \rfloor \times R \rfloor \times R^{-1}$, for setting the $N_{i,j}^{gating}$ is advantageous in that a value of the CRC bits or the remaining bits, set before the channel coding, becomes an integer. Therefore, although there is no data to be transmitted by newly defining the $N_{i,j}^{gating}$, a dedicated physical data channel is generated using dummy bits as data bits.

That is, the $N_{data,j}^{gating}$ represents the total number of bits filled in the CCTrCH included in one radio frame of the transport format combination j. If the gating rate is 1/n, then $N_{data,j}^{gating} = N_{data,j}/n$. Further, in Equation (5), $RM_1$ represents a rate matching constant of an $i^{th}$ transport channel, $Z_{i,j}^{gating}$ represents an intermediate rate matching parameter, and $\Delta N_{i,j}^{gating}$ represents a final rate matching target value used for the gating. If the final target value is a positive number, it represents the number of bits repeated in one radio frame of the $i^{th}$ transport channel of the transport format combination j. However, if the final target value is a negative number, it represents the number of bits punctured in the radio frame. In addition, l represents the number of transport channels included in the CCTrCH.

Meanwhile, in Equation (3), the existing method divides a value of the parameters $N_{i,j}^{gating}$ and $N_{data,j}^{gating}$ by the gating rate. That is, if the gating rate is 1/n, then $N_{i,j}^{gating} = \lfloor N_{i,j}/n \rfloor$. Hence, $Z_{i,j}^{gating} = \lfloor Z_{i,j}/n \rfloor$. Likewise, $\Delta N_{i,j}^{gating} = \lfloor \Delta N_{i,j}/n \rfloor$. Therefore, from Equation (1) and Equation (5), $\Delta N_{i,j}^{gating}/N_{i,j}^{gating} \approx \Delta N_{i,j}/N_{i,j}$, thus satisfying a condition of Equation (4). That is, the change in the target SIR is almost negligible, regardless of the use of the DPCCH gating.

Next, as described above, first to fourth embodiments of the present invention newly define the $N_{i,j}^{gating}$ value during the DPCCH gating, and then create a DPDCH (Dedicated Physical Data Channel) using dummy bits as data bits to match a $N_{i,j}^{gating}$ length, although there is no actual transmission data. Therefore, it is possible to transmit the CRC bit-added DPDCH without excessive CRC repetition by transmitting the dummy bits as data bits even during the DPCCH gating. As a result, it is possible to maintain a proper target SIR, contributing to efficient outer loop power control.

First, a transport channel multiplexing method used during the uplink DPCCH gating according to the first and second embodiment of the present invention will be described with reference to FIGS. 6 to 8. In particularly, the first embodiment will be described on the assumption that the dedicated control channel has a gating rate of ⅓.

Figure 6:
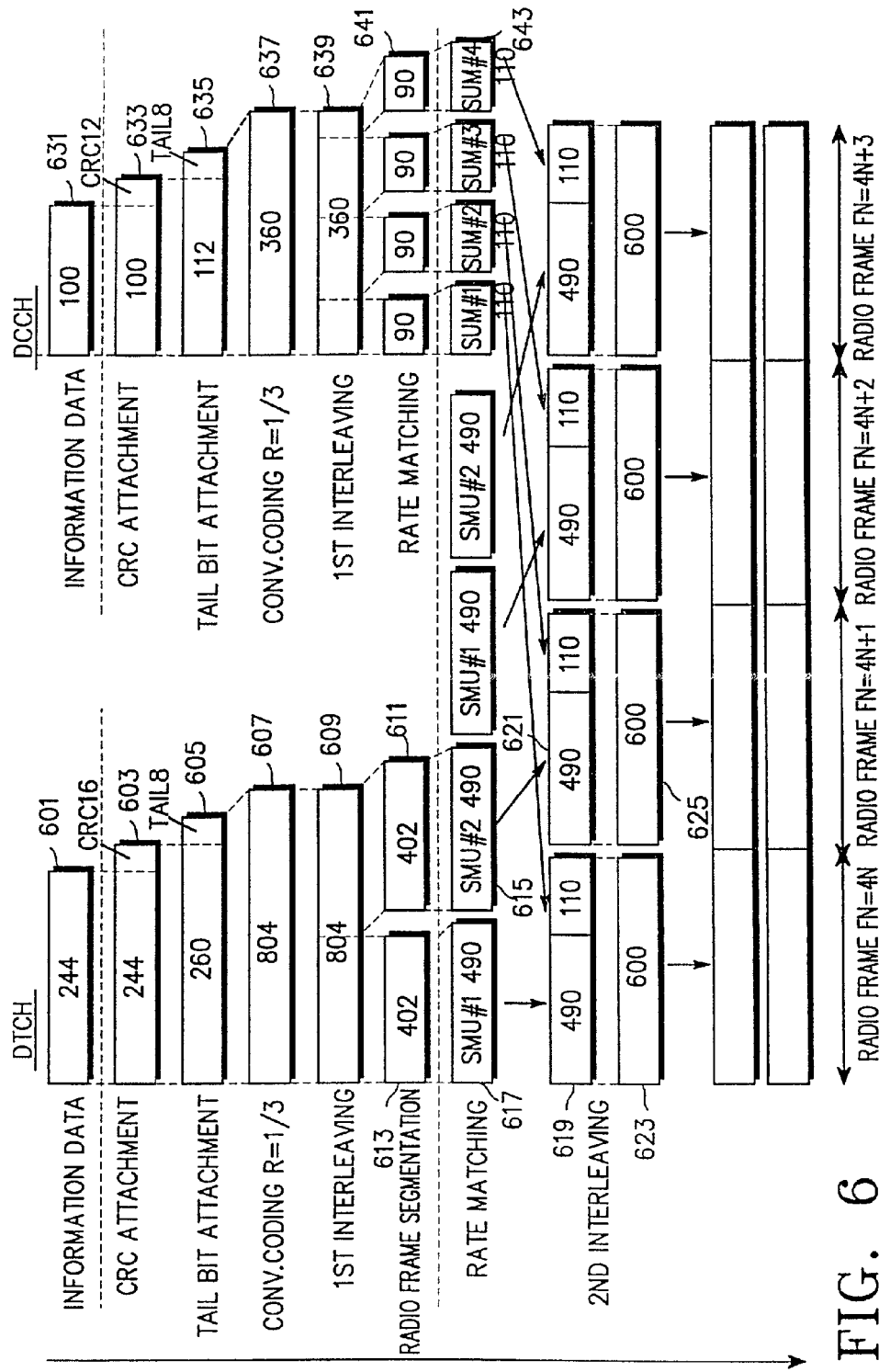
FIG. 6 illustrates process for channel-coding an uplink channel having performance of 12.2 Kbps used in a W-CDMA communication system according to an embodiment of the present invention.
Figure 7:
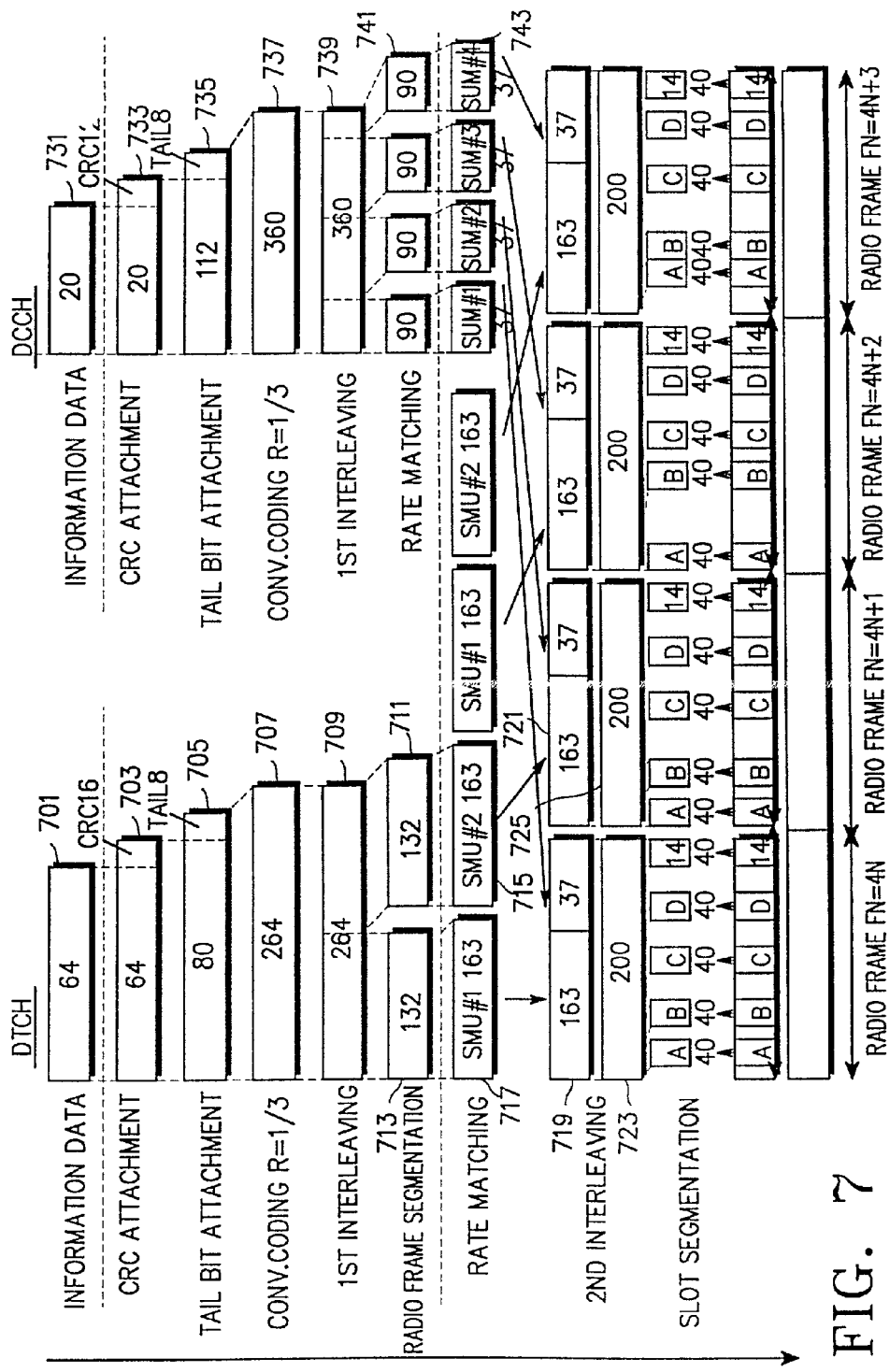
FIG. 7 illustrates a modified uplink channel of FIG. 6 for ⅓ DPCCH gating.
Figure 8:
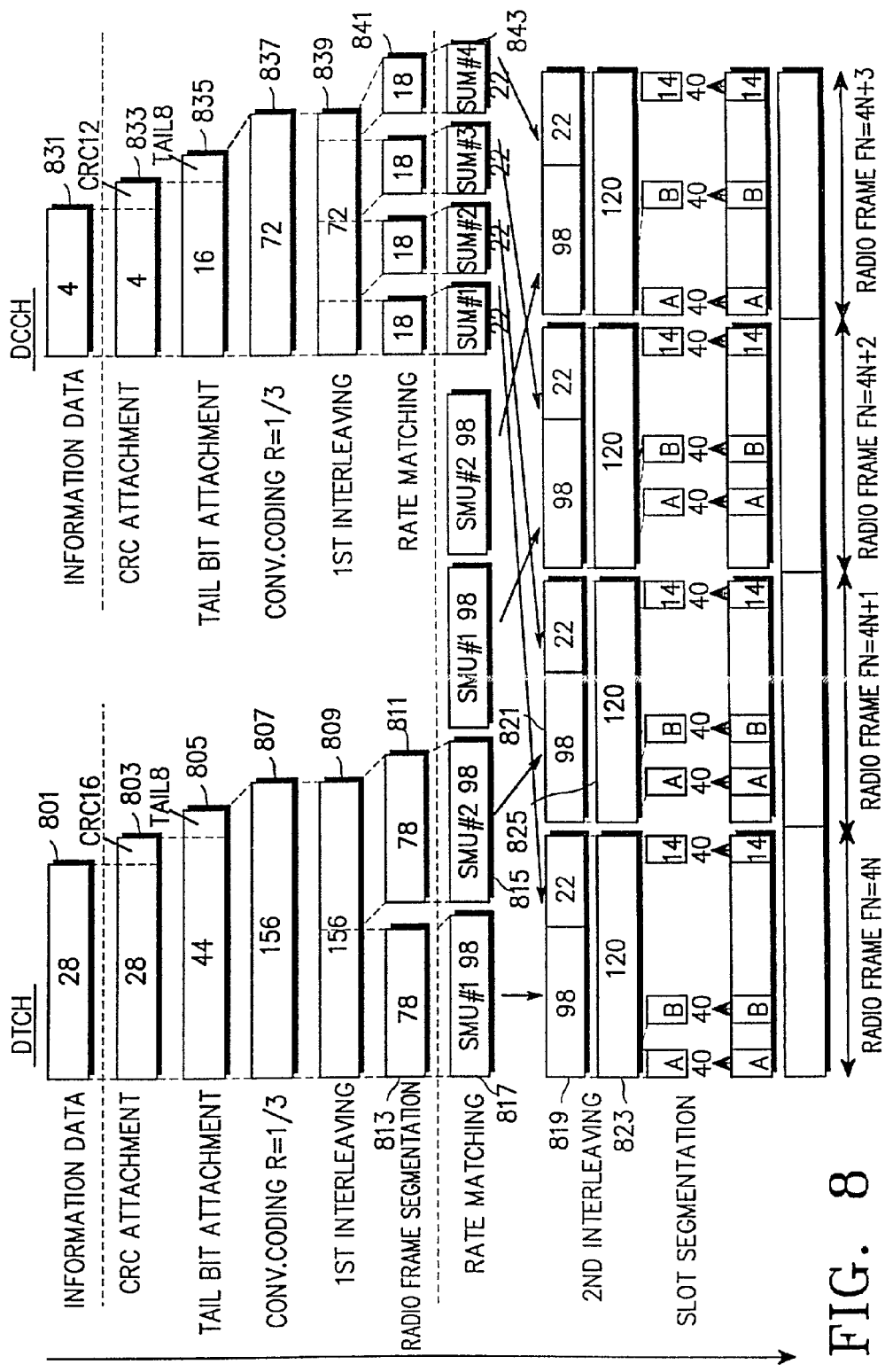
FIG. 8 illustrates a modified uplink channel of FIG. 6 for ⅕ DPCCH gating.

FIG. 6 illustrates process for channel-coding an uplink channel having performance of 12.2 Kbps used in a W-CDMA communication system, FIG. 7 illustrates a modified uplink channel of FIG. 6 for ⅓ DPCCH gating, and FIG. 8 illustrates a modified uplink channel of FIG. 6 for ⅕ DPCCH gating.

First, a process for channel-coding a dedicated traffic channel (DTCH) of uplink logical channel (the logical channel is consisted of DTCH and DCCH) will be described with reference to FIG. 6. For the sake of convenience, the steps of channel-coding the DTCH will be represented in the form of blocks, and a number in each block indicates the number of bits processed in the block. Referring to FIG. 6, 244-bit information data is received in block 601, 16-bit CRC is added to the information data in block 603, and then, 8 tail bits are added to the CRC-added information data in block 605.

Further, the CRC and tail bit-added information data is subject to ⅓ coding (coding rate R=⅓) in block 607, thus generating 804 bits. Herein, the coding is assumed to be convolutional coding. The convolutional-coded bits are interleaved in block 609, and then, segmented into two radio frames with a size $N_{i,j}$=402 in blocks 611 and 613. The two radio frames are subject to rate matching in blocks 615 and 617, respectively, so that each radio frame generates 490 bits proper for an actual physical channel.

Meanwhile, during the gating operation in the ⅓ DPCCH gating of FIG. 7, a proper size of a dummy bit stream is determined on the basis of the 402-bit radio frame stored in a buffer just before the gating operation, and then dummy bits are inserted in the information data. Therefore, in blocks 711 and 713 of FIG. 7, the number of the information data bits becomes $N_{i,j}^{gating} = \lfloor N_{i,j}/n \rfloor = 402/3 = 132$ or $N_{i,j}^{gating} = \lfloor \lfloor N_{i,j} \times (1/n) \rfloor \times R \rfloor \times R^{-1} = \lfloor \lfloor 402/3 \rfloor \times (⅓) \rfloor \times 3 = 132$, selectively using the formulas according to the present invention. Here, since the $N_{i,j}^{gating}$ is a multiple of a reciprocal (3) of the coding rate (⅓), it has the intact value 132. In addition, the $N_{data,j}^{gating}$ has a value of 600/3=200. FIG. 7 illustrates a channel coding scheme, i.e., a channel multiplexing scheme for the ⅓ gating, and a length of the actually transmitted information data bits is calculated by multiplying $N_{i,j}^{gating}$ by the number of radio frames per TTI, dividing the multiplication result by a reciprocal of a channel coding rate, and then subtracting the number of tail bits and CRC bits from the division result, in reverse order of the channel multiplexing. That is, the length of the actually transmitted information bits becomes 132 ($N_{i,j}^{gating}$)×2(TTI=20 ms)÷3 (reciprocal of the coding rate ⅓)−8(tail bits)−16(CRC bits)=64 bits. The length of the data bits is calculated by a controller (not shown), and information data of the calculated data bit length is provided to the uplink transport channel generation block 301 of FIG. 3 and the downlink transport channel generation block 401 of FIG. 4 in order to establish the uplink and downlink transport channels. Since there is no user data actually transmitted during the gating, meaningless dummy bits are used for the 64-bit data in block 701.

Next, in the case of the DCCH (Dedicated Control Channel), since TTI is 40 ms, the $N_{i,j}$ has a value of 90 in block 641 of FIG. 6. Therefore, in block 741 of FIG. 7, the data bit number becomes $N_{i,j}^{gating} = \lfloor \lfloor 90/3 \rfloor \times (⅓) \times 3 \rfloor = 30$. In this case, the data bit length should be 20 bits, and for this, dummy bits are used as data bits considering the gating state where there exists no transmission data.

Next, the second embodiment of the present invention will be described on the assumption that the dedicated control channel has a gating rate of ⅕. First, the dedicated traffic channel (DTCH) out of two logical channels (DTCH and DCCH) will be described with reference to FIG. 6. Referring to FIG. 6, 244-bit information data is received in block 601, 16-bit CRC is added to the information data in block 603, and then, 8 tail bits are added to the CRC-added information data in block 605. The output data of block 607 is comprised of 804 bits. The 804-bit output data is subject to interleaving in block 609, and then, segmented into two $N_{i,j}$=402-bit radio frames in block 611. The 402-bit radio frames are subject to rate matching in blocks 615 and 617, respectively.

Meanwhile, during the gating operation, a proper size of a dummy bit stream is determined on the basis of the 402-bit radio frame stored in a buffer just before the gating operation, and then dummy bits are inserted in the information data. Therefore, in blocks 811 and 813 of FIG. 8, the number of the information data bits becomes $N_{i,j}^{gating} = \lfloor N_{i,j}/n \rfloor = \lfloor 402/5 \rfloor = 80$, using the first formula according to the present invention. However, since the bit number 80 is not a multiple of the coding rate, the information data is subject to puncturing so that the bit number becomes 78, which is a multiple of a reciprocal 3 of the coding rate and is also a downlink integer. Alternatively, the number of the information data bits becomes $N_{i,l}^{gating}=\lfloor\lfloor N_{i,j}\times(1/n)\rfloor\times R\rfloor\times R^{-1}=\lfloor\lfloor 402/5\times(1/3)\rfloor\times 3\rfloor=78$, using another formula according to the present invention. Since the $N_{i,l}^{gating}$ based on the latter formula is a multiple of a reciprocal 3 of the coding rate, it has the intact value 78. In addition, the $N_{i,l}^{gating}$ has a value of 600/5=120. FIG. 8 illustrates a channel multiplexing scheme for ⅕ gating, and a length of the actually transmitted information data bits is calculated by multiplying $N_{i,l}^{gating}$ by the number of radio frames per TTI, dividing the multiplication result by a reciprocal of a channel coding rate, and then subtracting the number of tail bits and CRC bits from the division result. In this embodiment, the length of the actually transmitted information bits becomes 78 ($N_{i,l}^{gating}$)×2(TTI=20 ms)÷3(reciprocal of the coding rate ⅓)−8(tail bits)−16(CRC bits)=28 bits. The length of the data bits is calculated by a controller (not shown), and information data of the calculated data bit length is provided to the uplink transport channel generation block 301 of FIG. 3 and the downlink transport channel generation block 401 of FIG. 4 in order to establish the uplink and downlink transport channels. Since there is no user data to be transmitted during the gating, meaningless dummy bits are used for the 28-bit data in block 801.

Next, in the case of the DCCH (Dedicated Control Channel), since TTI is 40 ms, the $N_{i,j}$ has a value of 90 in block 641. Therefore, in block 841 of FIG. 8, the data bit number becomes $N_{i,l}^{gating}=\lfloor\lfloor 90/5\rfloor\times(1/3)\times 3\rfloor=18$. In this case, the data bit length should be 4 bit, and for this, dummy bits are used as data bits considering the gating state where there exists no transmission data.

A multiplexing method for downlink DPCCH gating according to the third and fourth embodiments of the present invention will be described with reference to FIGS. 9 to 11.

In the case of the downlink channel, rate matching is performed in a TTI unit under 3GPP TS25.212 as described in the prior art, so that the rate matching is performed based on $N_{i,l}^{TTI}$. Therefore, even in the case of the uplink channel, $N^{i,j,TTI,gating}$ for the downlink channel is defined and used in place of the $N_{i,l}^{TTI}$, as proposed in the present invention. The $N_{i,l}^{TTI,gating}$ can be construed as the number of bits included in one TTI of a transport channel i with a transport format l set up to equally or similarly maintain a transmission power level of the symbols or bits transmitted before the gating, as well as a transmission power level of the CRC bits or the other bits transmitted for the outer loop power control during the gating. The reason for equally or similarly maintain a transmission power level of the symbols or bits transmitted before the gating and a transmission power level of the CRC bits or the remaining bits transmitted for the outer loop power control during the gating is because when the CRC bits or the remaining bits are transmitted without setting up of the $N_{i,l}^{TTI,gating}$ during the gating, they may be excessively repeated in actual transmission. The excessive repetition decreases the target SIR in actual transmission during the gating, and the decrease in the target SIR may cause occurrence of a power control error during the outer loop power control after the gating. In setting the $N_{i,l}^{TTI,gating}$, if a gating rate is 1/n and a channel coding rate is R, then $N_{i,l}^{TTI,gating}=\lfloor N_{i,l}^{TTI}/n\rfloor$ or $N_{i,l}^{TTI,gating}=\lfloor\lfloor N_{i,l}^{TTI}\times(1/n)\rfloor\times R\rfloor\times R^{-1}$.

The second formula, $N_{i,l}^{TTI,gating}=\lfloor\lfloor N_{i,l}^{TTI}\times(1/n)\rfloor\times R\rfloor\times R^{-1}$, for setting the $N_{i,l}^{TTI,gating}$ is advantageous in that a value of the CRC bits or the remaining bits, set before the channel coding, becomes an integer. Therefore, although there is no data to be transmitted by newly defining the $N_{i,l}^{TTI,gating}$, a dedicated physical data channel is generated using dummy bits as data bits.

When the position of the transport channel is fixed regardless of the transport format combination by using the $N_{i,l}^{TTI,gating}$ instead of the $N_{i,l}^{TTI}$ of Equation (2) or (3), $N_{i,*}$ is calculated in accordance with Equation (2). However, when the position of the transport channel is variable, $N_{i,j}$ is calculated in accordance with Equation (3). The downlink rate matching is performed by Equation (5) and a method defined in 3GPP TS25.212, using the $N_{i,*}$ or $N_{i,j}$. However, when the $N_{i,*}$ is used in the rate matching process, the $N_{i,*}$ is substituted in Equation (5) instead of the $N_{i,j}$. In this downlink rate matching process, since the total number of bits filled in the CCTrCH per radio frame is independent of a transport format combination j, $N_{data,*}^{gating}$ is used in place of the $N_{data,j}^{gating}$ in Equation (5). The $N_{data,*}^{gating}$ represents the total number of the CCTrCH bits filled in one radio frame during the gating. If the gating rate is 1/n, then $N_{data,*}^{gating}=\lfloor N_{data,*}\times P\times 1/n\rfloor$, where P represents the number of transport channels included in one radio frame.

As described above, the present invention newly defines the $N_{i,l}^{TTI,gating}$ value during the DPCCH gating, and then creates a DPDCH (Dedicated Physical Data Channel) using dummy bits as data bits to match a $N_{i,j}^{gating}$ length, although there is no transmission data. Therefore, it is possible to transmit the CRC bit-added DPDCH without excessive CRC repetition even during the DPCCH gating. As a result, it is possible to determine a reliable target SIR, thus contributing to efficient outer loop power control.

Figure 9:
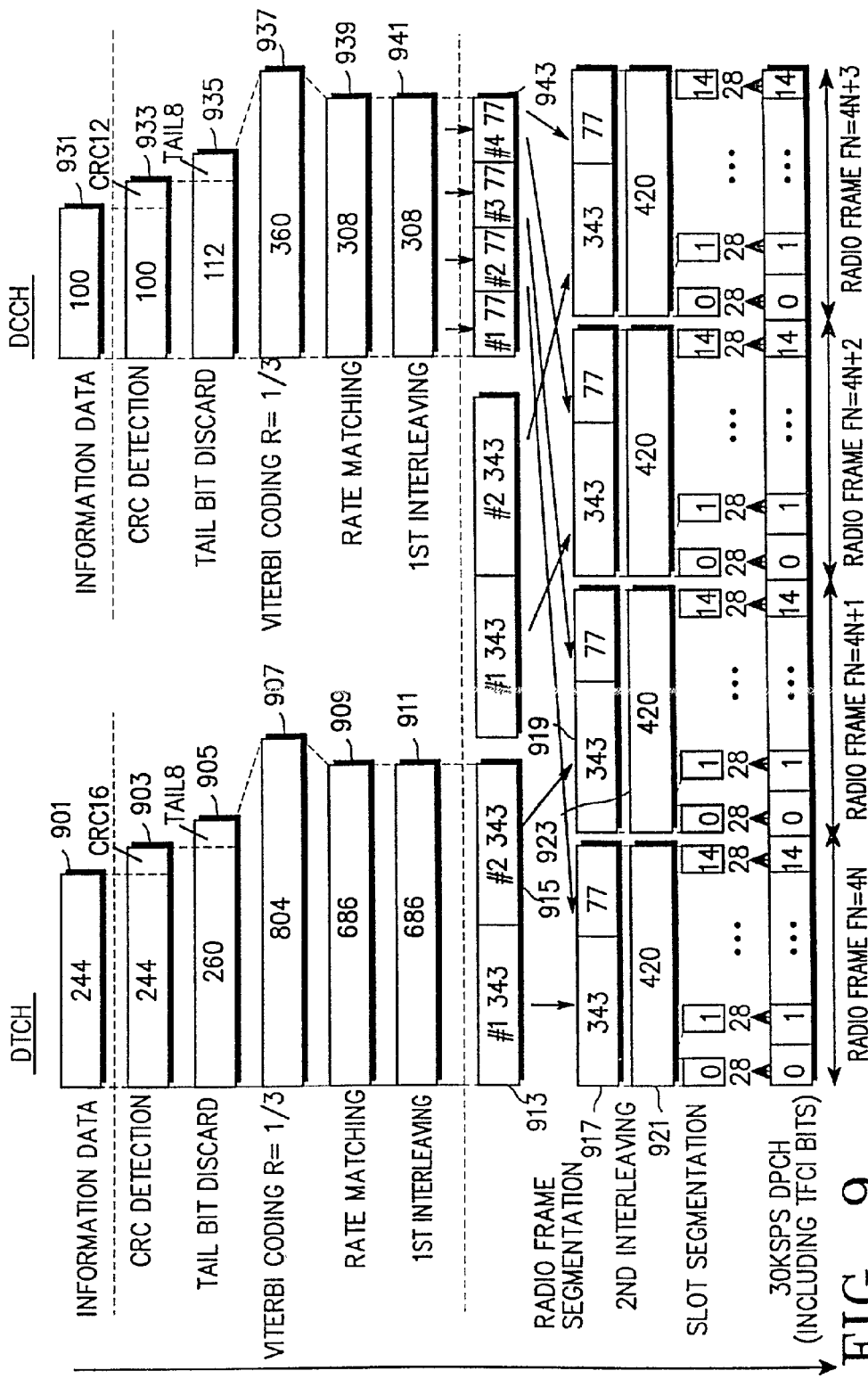
FIG. 9 illustrates a structure of a downlink channel having performance of 12.2 Kbps used in a W-CDMA communication system according to an embodiment of the present invention.
Figure 10:
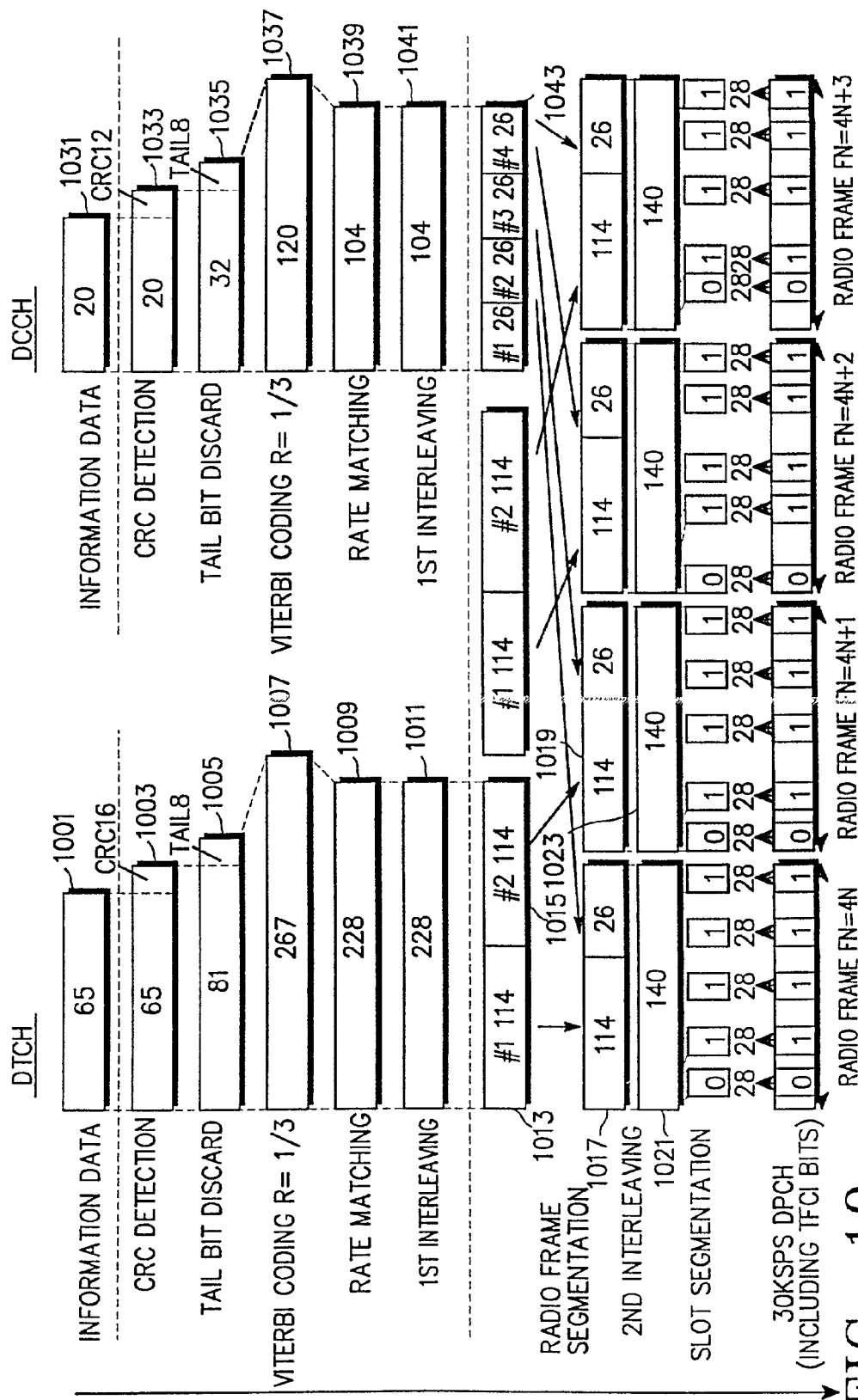
FIG. 10 illustrates a modified downlink channel of FIG. 9 for ⅓ DPCCH gating.

FIG. 9 illustrates a structure of a downlink channel having performance of 12.2 Kbps used in a W-CDMA communication system, and FIG. 10 illustrates a modified downlink channel of FIG. 9 for ⅓ DPCCH gating. First, a dedicated traffic channel (DTCH) out of two uplink logical channels (DTCH and DCCH) will be described herein below. Referring to FIG. 9, 244-bit information data is received in block 901, 16-bit CRC is added to the information data in block 903, and then, 8 tail bits are added to the CRC-added information data in block 905. Further, in block 907, $N_{i,l}^{TTI}$ has a value of 804 and $N_{data,*}$ has a length of 420 by channel encoding.

Therefore, in block 1007 of FIG. 10, $N^{i,j,TTI,gating}=\lfloor\lfloor N_{i,l}^{TTI}\times(1/n)\rfloor\times R\rfloor\times R^{-1}=\lfloor\lfloor 804/3\rfloor\times(1/3\times)\rfloor\times 3=267$. Further, $N_{data,*}^{gating}=420/3=140$, so that the output of a rate matching block 1009 is comprised of 228 bits. The downlink channel multiplexing scheme for ⅓ gating is illustrated in FIG. 10. Therefore, a length of the data bits should become 65 bits. The length of the data bits is calculated by a controller (not shown), and information data of the calculated data bit length is provided to the uplink transport channel generation block 301 of FIG. 3 and the downlink transport channel generation block 401 of FIG. 4. Since there is no transmission data during the gating, meaningless dummy bits are used for the 65-bit data. Typically, '0' bits or DTX bits are used for the dummy bits.

Next, in the case of the DCCH (Dedicated Control Channel), the output of block 937 in FIG. 9 has a value of $N_{i,l}^{TTI}=360$. Therefore, the number of output bits of block 1037 in FIG. 10 becomes $N_{i,l}^{TTI\ gating}=\lfloor\lfloor N_{i,l}^{TTI}\times(1/n)\rfloor\times R\rfloor\times R^{-1}=360/3=120$. In this case, the data bit length should be 20 bits, and for this, dummy bits are used as data bits considering the gating state where there exists no transmission data. In block 1039, a rate matching part outputs 104 bits. Therefore, a channel multiplexing scheme for ⅓ gating is illustrated in FIG. 10. A length of the information bits is calculated by a controller (not shown), and information data of the calculated data bit length is provided to the uplink transport channel generation block 301 of FIG. 3 and the downlink transport channel generation block 401 of FIG. 4.

A channel multiplexing method for ⅕ DPCCH gating according to the fourth embodiment of the present invention will be described herein below. FIG. 11 illustrates a modified downlink channel of FIG. 9 for ⅕ DPCCH gating. First, a dedicated traffic channel (DTCH) out of two uplink logical channels (DTCH and DCCH) will be described herein below. Referring to FIG. 9, 244-bit information data is received in block 901, 16-bit CRC is added to the information data in block 903, and then, 8 tail bits are added to the CRC-added information data in block 905. Further, in block 907, $N_{i,j}^{TTI}$ has a value of 804 and $N_{data,*}$ has a length of 420 by channel encoding.

Figure 11:
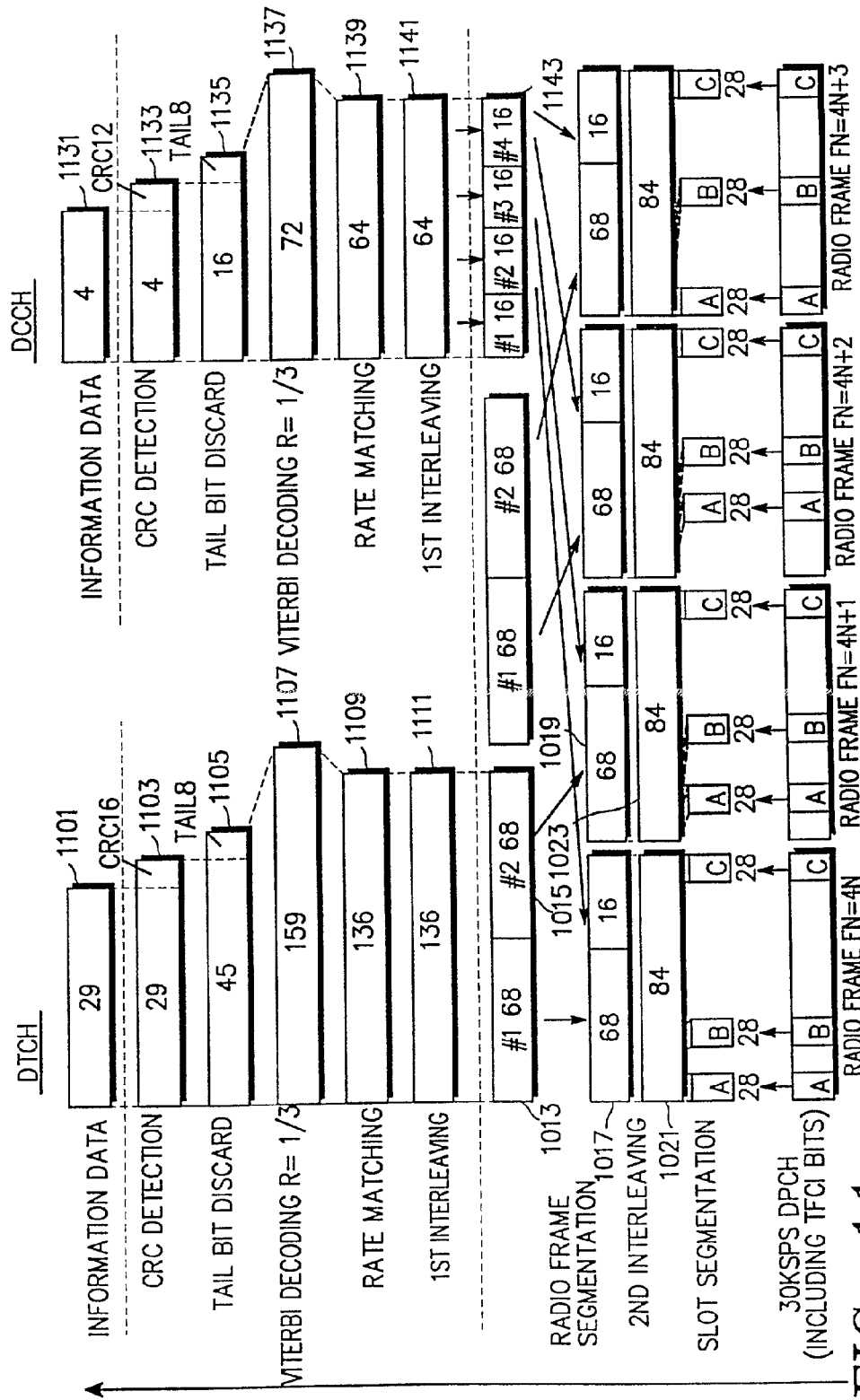
FIG. 11 illustrates a modified downlink channel of FIG. 9 for ⅕ DPCCH gating.

Therefore, in block 1107 of FIG. 11, $N^{i,j TTI,gating} = \lfloor \lfloor N_{i,j}^{TTI} \times (1/n) \rfloor \times R \rfloor \times R^{-1} = \lfloor \lfloor 804/5 \rfloor \times (1/3) \rfloor \times 3 = 159$, and $N_{data,*} = 420/5 = 84$. Thus, a rate matching part outputs 136 bits in block 1109. The channel multiplexing scheme for the ⅕ gating is illustrated in FIG. 11. Therefore, a length of the data bits should become 29 bits. The length of the data bits is calculated by a controller (not shown), and information data of the calculated data bit length is provided to the uplink transport channel generation block 301 of FIG. 3 and the downlink transport channel generation block 401 of FIG. 4. Since there is no transmission data during the gating, meaningless dummy bits are used for the 29-bit data. Typically, '0' bits or DTX bits are used for the dummy bits.

Next, in the case of the DCCH (Dedicated Control Channel), $N_{i,j}^{TTI} = 360$ in block 1037 of FIG. 10. Therefore, in block 1137 in FIG. 11, $N_{i,j}^{TTI,gating} = \lfloor \lfloor N_{i,j}^{TTI} \times (1/n) \rfloor \times R \rfloor \times R^{-1} = 360/5 = 72$. In this case, the data bit length should be 4 bits, and for this, dummy bits are used as data bits considering the gating state where there exists no transmission data. In block 1139, the rate matching part outputs 64 bits. Thus, a channel multiplexing scheme for the ⅕ gating is illustrated in FIG. 11. A length of the information bits is calculated by a controller (not shown), and information data of the calculated data bit length is provided to the uplink transport channel generation block 301 of FIG. 3 and the downlink transport channel generation block 401 of FIG. 4.

Meanwhile, a fifth embodiment of the present invention provides an apparatus and method for transmitting data over a dedicated physical data channel, when the uplink channel or the downlink channel is required to transmit a dedicated physical channel for outer loop power control, even though there is no transport channel data to transmit. The fifth embodiment transmits CRC bits and dummy bits over the dedicated physical data channel in order to properly maintain the target SIR for the outer loop power control. This will be described with reference to FIGS. 12 and 13.

Figure 12:
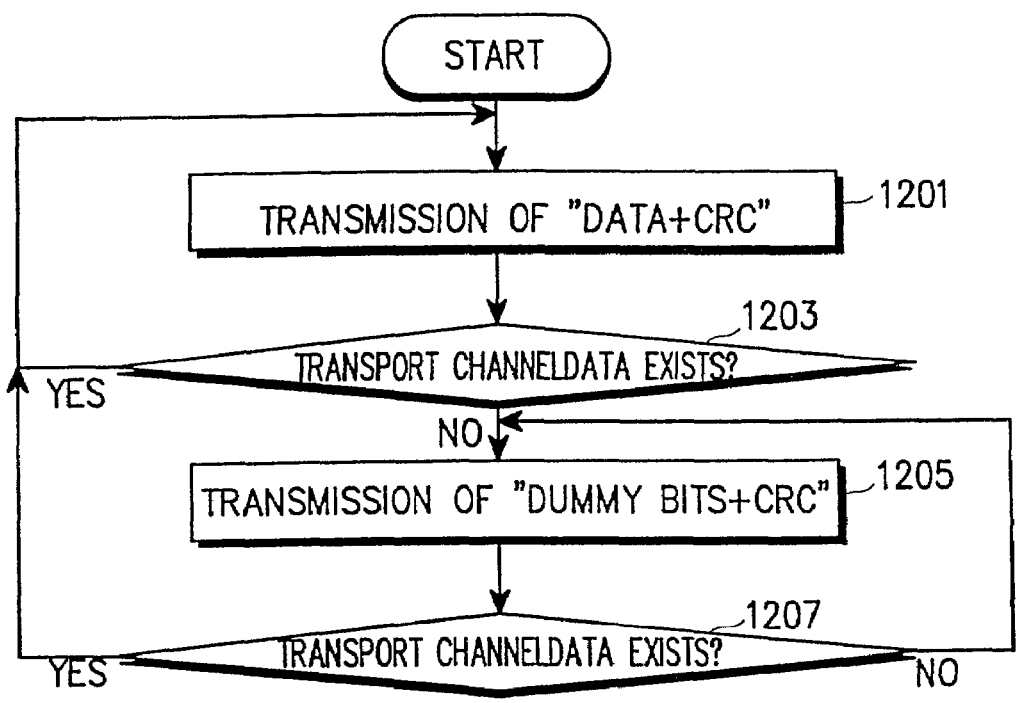
FIG. 12 illustrates a process for multiplexing the dedicated physical channel according to an embodiment of the present invention.

FIG. 12 illustrates a process for multiplexing the dedicated physical channel according to an embodiment of the present invention. Referring to FIG. 12, a Node B transmits transport channel data and CRC bits over the dedicated physical data channel in step 1201. If it is determined in step 1203 that there is no more transport channel data to transmit, the Node B transmits dummy bits instead of the transport channel data along with the CRC bits, for proper outer loop power control, in step 1205. Thereafter, when there exists transport channel data to transmit in step 1207, the Node B normally transmits the transport channel data and the CRC bits over the dedicated physical data channel in step 1201. Here, the dummy bit value may be '1' or '0'.

An amount of the dummy bits transmitted during absence of the transport channel data depends upon how to maintain the target SIR for the outer loop power control during the absence of the transport channel data. For example, in order to maintain the same target SIR as when the transport channel data is transmitted last, the Node B must transmit dummy bits as much as the last transmitted transport channel data, thus making it possible to maintain the same target SIR as when there exists transport channel data although there exists no transport channel data actually transmitted over the dedicated physical data channel.

For example, if 244-bit transport channel data was transmitted over the DTCH every 20 ms-TTI and 100-bit transport channel data was transmitted over the DCCH every 40 ms-TTI as illustrated in FIG. 6, the number of dummy bits transmitted over the DTCH during absence of the actual transport channel data should also become 244 bits per 20 ms TTI and the number of dummy bits transmitted over the DCCH during absence of the actual transport channel data should also become 100 bits per 40 ms TTI, in order to perform the same outer loop power control as when there exists actual transport channel data. Unlike this, it is also possible to previously set the number of the dummy bits to be transmitted along with the CRC bits, which are transmitted for the outer loop power control although there is no transport channel data to be actually transmitted. During the gating, the number of the dummy bits should be determined considering the gating rate.

FIG. 12 has described a process for generating the CRC bits and the dummy bits for the outer loop power control, in order to maintain a dedicated physical channel for the outer loop power control although there exists no actual transport channel data. Next, an apparatus for generating the CRC bits and the dummy bits for the outer loop power control will be described with reference to FIG. 13.

Figure 13:
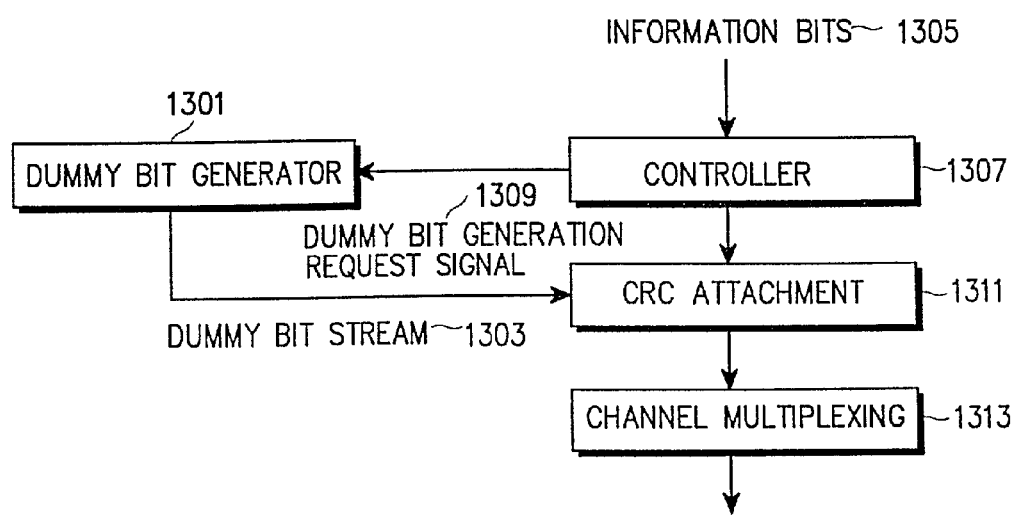
FIG. 13 illustrates an apparatus for multiplexing a dedicated physical channel according to an embodiment of the present invention.

FIG. 13 illustrates an apparatus for multiplexing a dedicated physical channel according to an embodiment of the present invention. Specifically, FIG. 13 illustrates an apparatus for transmitting the dummy bits and the CRC bits for the outer loop power control during absence of the transport channel data, as described with reference to FIG. 12.

Referring to FIG. 13, a controller 1307 determines whether there exists further transport channel data to transmit, while transmitting the transport channel data and the CRC bits. Here, whether there exists the transport channel data is determined by the controller 1307 by checking whether there exist input information bits 1305. If it is determined that there exist input information bits 1305, the controller 1307 provides the input information bits 1305 to a CRC attachment part 1311 as in the normal DPCH multiplexing process. The CRC attachment part 1311 attaches CRC bits to the information bits 1305 output from the controller 1307, and then provides the CRC bit-attached information bits 1305 to a channel multiplexing chain 1313. The channel multiplexing chain 1313 then generates transport channel data by performing a chain of channel multiplexing processes, including channel coding, interleaving, radio frame segmentation and rate matching, on the signal output from the CRC attachment part 1311.

However, if it is determined that there exist no more information bits 1305 to transmit, the controller 1307 generates dummy bits to be substituted for the information bits 1305, in order to maintain the dedicated physical channel for the outer loop power control though there exists no transport channel data to be actually transmitted. More specifically, when it is determined that there exist no information bits 1305 to transmit, the controller 1307 transmits a dummy bit generation request signal 1309 to a dummy bit generator 1301. Upon receipt of the dummy bit generation request signal 1309 from the controller 1307, the dummy bit generator 1301 generates dummy bits to be substituted for the information bits 1305. Here, the dummy bits may be '0' or '1', and the number of the dummy bits generated by the dummy bit generator 1301 is controlled by the controller 1307. That is, the controller 1307 determines a pattern and a length of a dummy bit stream 1303 generated by the dummy bit generator 1301. The length of the dummy bit stream 1303 is set to either the number of data bits of the transport channel last transmitted before transmission of the dummy bits as described in FIG. 12, or a length preset in the system. Here, the number of data bits of the transport channel last transmitted before transmission of the dummy bits refers to the number of data bits of the transport channel transmitted during presence of the transport channel data in the normal DPCH transmission mode, and the number of data bits of the previously transmitted transport channel in the gated transmission mode where there exists no transport channel data to transmit after the end of the normal transmission mode.

The dummy bit generator 1301 provides the generated dummy bit stream 1303 to the CRC attachment part 1311. The CRC attachment part 1311 attaches CRC bits to the dummy bit stream 1303 output from the dummy bit generator 1301, and then provides the CRC bit-attached dummy bit stream 1303 to the channel multiplexing chain 1313. The channel multiplexing chain 1313 then generates transport channel data by performing a chain of channel multiplexing processes, including channel coding, interleaving, radio frame segmentation and rate matching, on the signal output from the CRC attachment part 1311.

As described in FIGS. 12 and 13, in order to maintain the dedicated physical channel for the outer loop power control although there exists no actual transport channel data, it is possible to prevent a decrease in the target SIR during the outer loop power control by transmitting the same bit stream as when the transport channel data is actually transmitted using the CRC bits. Therefore, it is possible to maintain a constant outer loop power control gain.

Meanwhile, the present invention provides a secondary interleaver. As illustrated in both the uplink channel multiplexing scheme of FIG. 3 and the downlink channel multiplexing scheme of FIG. 4, the secondary interleaver (313, 413) is arranged at a preceding stage of the physical channel mapping part. A general secondary interleaver has performance of a block interleaver, and operates as follows.

Input bits of the secondary interleaver are defined as $u_{p,1}, u_{p,2}, \ldots, u_{p,U}$, where p indicates a physical channel number and U indicates a full length of the bits included in one physical channel. The secondary interleaver defines a matrix having a fixed number of columns C2 (set to 30) and a variable number of rows R2 being dependent upon an amount of the data. The R2 should become a minimum integer satisfying a formula, $U \leq R2 \times C2$. The input bits $u_{p,1}, u_{p,2}, \ldots, u_{p,U}$ are received in a row, generating an R2×C2 matrix of Equation (6).

$$\begin{bmatrix} y_{p,1} & y_{p,2} & y_{p,3} & \cdots & y_{p,C2} \\ y_{p,(C2+1)} & y_{p,(C2+2)} & y_{p,(C2+3)} & \cdots & y_{p,(2 \times C2)} \\ \vdots & \vdots & \vdots & \cdots & \vdots \\ y_{p,((R2-1) \times C2+1)} & y_{p,((R2-1) \times C2+2)} & y_{p,((R2-1) \times C2+3)} & \cdots & y_{p,(R2 \times C2)} \end{bmatrix}$$ Equation (6)

In the matrix of Equation (6), $y_{p,k} = u_{p,k}$ where $k=1, 2, \ldots, U$. If $U < R2 \times C2$, dummy bits are attached to satisfy $R2 \times C2 = U$. The matrix shown in Equation (6) is subject to column permutation using Table 1.

TABLE 1

| Number of Columns (C2) | Column Permuted Form <P2(0),P2(1), ... , P2(C2-1)> |
|---|---|
| 30 | <0,20,10,5,15,25,3,13,23,8,18,28,1,11,21,6,16,26,4,14,24, 9,19,29,12,2,7,22,27,17> |

That is, each column of the matrix is permuted in the form of Table 1, so that $0^{th}$ column is rearranged in $0^{th}$ column, $20^{th}$ column in $1^{st}$ column, $10^{th}$ column in $2^{nd}$ column, ... , generating an output matrix of Equation (7).

$$\begin{bmatrix} y'_{p,1} & y'_{p,(R2+1)} & y'_{p,(2 \times R2+1)} & \cdots & y'_{p,((C2-1) \times R2+1)} \\ y'_{p,2} & y'_{p,(R2+2)} & y'_{p,(2 \times R2+2)} & \cdots & y'_{p,((C2-1) \times R2+2)} \\ \vdots & \vdots & \vdots & \cdots & \vdots \\ y'_{p,R2} & y'_{p,(2 \times R2)} & y'_{p,(3 \times R2)} & \cdots & y'_{p,(R2 \times C2)} \end{bmatrix}$$ Equation (7)

The secondary interleaver, i.e., a block interleaver, outputs $y'_{p,1}, y'_{p,2}, \ldots, y'_{p,U}$ in a row, and deletes the output bits corresponding to the attached dummy bits, thereby completing the secondary interleaving operation. The output of the secondary interleaver is provided to the physical channel mapping part 314 of FIG. 3 or the physical channel mapping part 415 of FIG. 4, and then subjected to physical channel mapping.

Meanwhile, during the DPCCH gating, the secondary interleaver operates in a different way. That is, the number of input bits of the secondary interleaver becomes less by the gating rate as compared with when the gating is not used, and the output of the secondary interleaver is also subjected to gating and then transmitted over only the selected slots. The present invention provides a modified secondary interleaver applicable to a DPCCH gating mode where the DPCCH gating is used.

TABLE 2

| | | Slots for Transmitting Downlink DPCCH | | |
|---|---|---|---|---|
| CFN | Gating Rate | Pilot | TPC | TFCI |
| CFN mod (RX gating DRX | 1 | All slots (0,1, ... ,14) | All slots (0,1, ... ,14) | All slots (0,1, ... ,14) |

TABLE 2-continued

| | | Slots for Transmitting Downlink DPCCH | | |
|---|---|---|---|---|
| CFN | Gating Rate | Pilot | TPC | TFCI |
| cycle) = 0 | 1/3 | j × 3 + s(i,j) − 1 | j × 3 + s(i,j) | All slots (0,1, . . . ,14) |
| | 1/5 | j × 5 + s(i,j) − 1 | j × 5 + s(i,j) | All slots (0,1, . . . ,14) |
| CFN mod (RX gating DRX cycle) ≠ 0 | 1 | All slots (0,1, . . . ,14) | All slots (0,1, . . . ,14) | All slots (0,1, . . . ,14) |
| | 1/3 | j × 3 + s(i,j) − 1 | j × 3 + s(i,j) | j × 3 + s(i,j) |
| | 1/5 | j × 5 + s(i,j) − 1 | j × 5 + s(i,j) | j × 5 + s(i,j) |

TABLE 3

| Gating Rate | Slots for Transmitting Uplink DPCCH (Pilot, TFCI, FBI, TPC) |
|---|---|
| 1 | All slots (0,1, . . . , 14) |
| 1/3 | j × 3 + s(i,j) |
| 1/5 | j × 5 + s(i,j) |

Table 2 shows slots for transmitting downlink DPCCHs according to the gating rates, and Table 3 shows slots for transmitting uplink DPCCHs according to the gating rates. In table 2, the DRX (Discontinuous Reception) cycle represents a certain interval where the receiver receives all signals regardless of the gating.

$$s(i, j) = \begin{cases} (A_j \oplus C_j)_{10} \bmod (S-1) + 1 & j = 0 \\ (A_j \oplus C_j)_{10} \bmod S & j = 1, \ldots, N-2 \\ S - 1 & J = N - 1 \end{cases} \quad \text{Equation (8)}$$

$$i = 0, 1, \ldots, 255$$

In Equation (8), N depicts a reciprocal of the gating rate, S=15/N, $A_j$ is defined as shown in Equation (9), i represents CFN (Current Frame Number), and $C_i$=i+256*i.

$$(a_{18}, a_{17}, \ldots, a_0) = \quad \text{Equation (9)}$$

$$(1, 0, 0, 1, 0, 1, 1, 1, 0, 1, 1, 0, 0, 1, 0, 1, 1, 0, 1)$$

$$A_j = \sum_{k=j}^{j+15} 2^{k-j} a_k \quad j = 0., 1, \ldots, N-2$$

During the DPCCH gating, a format of the slots transmitted over one 10 ms-radio frame is determined using Equation 8 and Tables 2 and 3. That is, the downlink slots for transmitting Pilot, TPC and TFCI bits can be determined using Table 2 according to s(i,j) of Equation (8), and the uplink slots for transmitting all the bits can be determined using Table 3. The downlink dedicated physical data channel for the outer loop power control is transmitted over the same slot as that of the TPC, while the uplink dedicated physical data channel for the outer loop power control is transmitted over the same slots as those of the Pilot, TPC, FBI and TFCI.

Therefore, the secondary interleaver should operate in a different mode from the existing non-DPCCH gating mode (i.e., normal transmission mode). An operation of the secondary interleaver for DPCCH gating according to sixth and seventh embodiments of the present invention will be described herein below.

In the sixth embodiment, the secondary interleaver maps transmission data only to several slots, which were selected according to the gating rate from 15 slots in one radio frame, in a system supporting the gated transmission.

During the gating, the number of input bits of the secondary interleaver is decreased by the gating rate as compared with when the gating is not used. Therefore, in order to maintain the size of the matrix shown in Equation (6), it is necessary to attach the dummy bits. In order to map the attached dummy bits to the physical channel using the intact matrix of the secondary interleaver applied to the existing non-gating mode, it is necessary to match the input bits of the secondary interleaver so that the interleaved signal are mapped in the gating slot format defined in Equation (8) and Tables 2 and 3. That is, when a number of a slot currently transmitted after being subject to gating is determined, columns corresponding to the transmitted slot is determined from Equation 7, and then meaningful columns to be transmitted in pre-column permutation data are determined from Equation (6). That is, a means of deinterleaving is used during the secondary interleaving. In this case, the input bits of the secondary interleaver are applied only to the meaningful columns of Equation 6, and dummy bits are applied to the remaining columns. Therefore, the meaningful data is mapped only to the slots subjected to the gated transmission when mapping the output of the secondary interleaver to the physical channel in the existing same method.

For example, if the gating rate is 1/3 and CFN=0, then S=5 and N=3. Thus, s(0,j) becomes {1,1,0,2,2} under Equation (6). Therefore, based on Table 2, the downlink channel transmits TPC, TFCI and DPDCH over $1^{st}$, $4^{th}$, $6^{th}$, $11^{th}$ and $14^{th}$ slots, and transmits Pilot over $0^{th}$, $3^{rd}$, $5^{th}$, $10^{th}$ and $13^{th}$ slots. In order to transmit the DPDCH over the $1^{st}$, $4^{th}$, $6^{th}$, $11^{th}$ and $14^{th}$ slots, the meaningful data, i.e., input bits of the secondary interleaver, should exist in the $2^{nd}$, $3^{rd}$, $8^{th}$, $9^{th}$, $12^{th}$, $13^{th}$, $22^{nd}$, $23^{rd}$, $28^{th}$ and $29^{th}$ columns in the matrix of Equation (7). Therefore, the meaningful data should exist only in the $1^{st}$, $5^{th}$, $8^{th}$, $9^{th}$, $10^{th}$, $11^{th}$, $17^{th}$, $23^{rd}$, $27^{th}$ and $29^{th}$ columns in the matrix of Equation (6), through column permutation of Table 1.

In addition, although the input bits are applied in a row to the secondary interleaver 414 of FIG. 4 in the matrix of Equation (6), only the $1^{st}$, $5^{th}$, $8^{th}$, $9^{th}$, $10^{th}$, $11^{th}$, $17^{th}$, $27^{th}$ and $29^{th}$ columns are filled with the data bits, while the remaining columns are filled with the dummy bits. After being filled with the data bits and dummy bits, the secondary interleaver creates the matrix of Equation (7) through column permutation of Table 1, and a total of 15 slots are mapped in such a manner that two columns are mapped to each slot along the columns of the matrix. As a result, the meaningful data bits are mapped to the $1^{st}$, $4^{th}$, $6^{th}$, $11^{th}$ and $14^{th}$ slots, for proper transmission during the gating.

In the second embodiment, the secondary interleaver maps transmission data only to several slots, which were selected according to the gating rate from 15 slots in one radio frame, in a system supporting the gated transmission. During the gating, the number of input bits of the secondary interleaver is decreased by the gating rate as compared with when the gating is not used. Therefore, if the number of columns of the matrix shown in Equation (6) is matched to the existing value, the number of rows will be decreased according to the gating rate. That is, after the input bits are applied along a row in the existing method, the dummy bits are attached to fill the last column and then the column permutation of Table 1 is performed, creating the output matrix of Equation (7). Likewise, the number of columns becomes smaller according to the gating rate as compared with the output matrix for the case of the existing normal transmission mode. If elements of the matrix are read in a row and then mapped with only the slots subjected to gated transmission, all the meaningful bits input to the secondary interleaver are mapped with only the slots subjected to gated transmission without the dummy bits, thus making it possible to perform efficient interleaving.

For example, if the gating rate is ⅓ and CFN=0, then S=5 and N=3. Thus, s(0,j) becomes {1,1,0,2,2} under Equation (6). Therefore, based on Table 2, the downlink channel transmits TPC, TFCI and DPDCH over $1^{st}$, $4^{th}$, $6^{th}$, $11^{th}$ and $14^{th}$ slots, and transmits Pilot over $0^{th}$, $3^{rd}$, $5^{th}$, $10^{th}$ and $13^{th}$ slots. During the non-gating mode, if the matrix of Equation (6) is a R2×C2=60×30 matrix in the secondary interleaving and it is not necessary to attach dummy bits, then an output matrix of Equation (7) also has a size of 60×30, and two columns are mapped to each slot along a row. That is, a size of one slot becomes 120 bits. In this case, for ⅓ gating, the matrix of Equation (6) becomes a 20×30 matrix. That is, a size of the column is reduced by the gating rate ⅓. The output matrix of Equation (7) created through column permutation of Table 1 also becomes a 20×30 matrix. In this case, 6 columns are mapped to each slot by mapping 5 slots among a total of 15 slots. That is, 20×6=120 bits are mapped to one slot, so that the data bits are equally transmitted as in the normal transmission mode.

An eighth embodiment of the present invention provides new interleaving for the gated transmission. The existing interleaving divides the C2 value of Equations (4) and (5) by the gating rate. That is, C2=10 for ⅓ gating and C2=6 for ⅕ gating embodiment, the matrix of Equations (6) and (7) is reduced in the number of the columns only, and becomes the same as when the gating is not used. However, the column permutation of Table 1 should be newly defined. 10 columns are permuted for ⅓ gating, while 6 columns are permuted for ⅕ gating. This is shown in Tables 4 and 5.

TABLE 4

| No of Columns (C2) | Column Permuted Form <P2(0),P2(1), . . . , P2(C2-1)> |
|---|---|
| 10 | <0,5,3,8,1,6,4,9,2,7> |

TABLE 5

| No of Columns (C2) | Column Permuted Form <P2(0),P2(1), . . . ,P2(C2-1)> |
|---|---|
| 6 | <0,5,3,1,4,2> |

In conclusion, the secondary interleaving is efficiently performed by mapping data bits in two columns to one slot along a row regardless of the gating rate in the output matrix of Equation (7).

As described above, when transmitting CRC bits for outer loop power control although there is no transport channel data in the uplink or downlink channel, the CDMA mobile communication system transmits dummy bits along with CRC bits so as to properly maintain a target SIR, thus making it possible to perform reliable outer loop power control. In addition, the present invention prevents a decrease in the target SIR during outer loop power control by transmitting the dummy data bits as many as the number of the transport channel data bits transmitted just before a point where there exists no transport channel data, in the case where the transport channel data does not exist temporarily even in the normal DPCH transmission mode, i.e., in the case where it is necessary to maintain the dedicated physical channel for outer loop power control although there exists no transport channel data to be actually transmitted. Thus, the outer loop power control gain is properly maintained, making it possible to continuously perform the stable outer loop power control even when there exists transport channel data after the absence of the transmission channel data.

In addition, the transmitter transmits the dedicated physical data channel according to the gating rate while transmitting the dedicated physical control channel, so that the receiver can receive the dedicated physical data channel even during the gating, contributing to accurate outer loop power control.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a dedicated physical data channel signal over a dedicated physical data channel in the absence of transmission data to be transmitted over the dedicated physical data channel in order to properly maintain a target SIR (Signal-to-Interference Ratio) when there exists new transmission data after the absence of the transmission data in a CDMA (Code Division Multiple Access) mobile communication system, comprising the steps of:
   generating a dummy bit generation request signal in the absence of the transmission data; and
   upon receipt of the dummy bit generation request signal, generating a dummy bit stream, and transmitting a dedicated physical data channel signal created by attaching the CRC (Cycle Redundancy Check) bit stream to the dummy bit stream over a dedicated physical data channel in order to maintain the target SIR (Signal-to-Interference Ratio).

2. The method as claimed in claim 1, wherein the dummy bit stream is equal in a number of bits to data bits transmitted over the dedicated physical data channel when the transmission data is present.

3. The method as claimed in claim 1, wherein the dummy bit stream has a predetermined number of bits.

4. An apparatus for transmitting a dedicated physical data channel signal over a dedicated physical data channel in the absence of transmission data to be transmitted over the dedicated physical data channel in order to properly maintain a target SIR when there exists new transmission data after the absence of the transmission data in a CDMA mobile communication system, comprising:

a controller for generating a dummy bit generation request signal in the absence of the transmission data;

a dummy bit generator for generating a dummy bit stream upon receipt of the dummy bit generation request signal;

a CRC (Cyclic Redundancy Check) attachment part for attaching a CRC bit stream to the dummy bit stream; and a channel multiplexing part for mapping a first bit stream created by attaching the CRC bit stream and the dummy bit stream to the dedicated physical data channel in order to maintain the target SIR (Signal-to-Interference Ratio).

5. The apparatus as claimed in claim 4, wherein the dummy bit stream is equal in bit number to data bits transmitted over the dedicated physical data channel when the transmission data is present.

6. The apparatus as claimed in claim 4, wherein the dummy bit stream has a predetermined number of bits.

* * * * *